(12) United States Patent
Funaoka

(10) Patent No.: US 11,868,028 B2
(45) Date of Patent: *Jan. 9, 2024

(54) ACCESSORY REMOVABLY ATTACHABLE TO A CAMERA BODY

(71) Applicant: NIKON CORPORATION, Tokyo (JP)

(72) Inventor: Takayuki Funaoka, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 16/951,594

(22) Filed: Nov. 18, 2020

(65) Prior Publication Data

US 2021/0072622 A1     Mar. 11, 2021

Related U.S. Application Data

(63) Continuation of application No. 16/512,873, filed on Jul. 16, 2019, now Pat. No. 10,877,356.

(30) Foreign Application Priority Data

Jul. 18, 2018   (JP) .................................. 2018-135199

(51) Int. Cl.
  *G03B 17/14* (2021.01)
  *G03B 7/26* (2021.01)
(52) U.S. Cl.
  CPC .............. *G03B 17/14* (2013.01); *G03B 7/26* (2013.01)
(58) Field of Classification Search
  CPC ...................................................... G03B 17/14
  See application file for complete search history.

(56) References Cited

U.S. PATENT DOCUMENTS 4,924,249 A    5/1990  Aihara et al.
5,060,005 A   10/1991  Itoh et al.
(Continued)

FOREIGN PATENT DOCUMENTS

EP    1612598 A1   1/2006
EP    2492743 A1   8/2012
(Continued)

OTHER PUBLICATIONS

Oct. 1, 2021 Office Action issued in U.S. Appl. No. 17/039,024.
(Continued)

*Primary Examiner* — Leon W Rhodes, Jr.
(74) *Attorney, Agent, or Firm* — Oliff PLC

(57) ABSTRACT

An accessory includes: a detection terminal; a first power supply terminal through which a first power supply voltage is supplied; a second power supply terminal through which a second power supply voltage is supplied; a ground terminal; a ready terminal; a first clock terminal; a first data terminal; a second data terminal; a second clock terminal; a third data terminal; a first circuit to which the first power supply voltage is supplied through the first power supply terminal; and a second circuit to which the second power supply voltage is supplied through the second power supply terminal, wherein: the ground terminal is used as a ground potential for the first circuit and the second circuit; and a distance between the second clock terminal and the first power supply terminal is longer than a distance between the first clock terminal and the first power supply terminal.

18 Claims, 14 Drawing Sheets

(56) References Cited

U.S. PATENT DOCUMENTS

| | | | |
|---|---|---|---|
| 5,161,026 A | 11/1992 | Mabuchi et al. | |
| 5,166,717 A | 11/1992 | Kawasaki et al. | |
| 5,382,994 A | 1/1995 | Naito et al. | |
| 7,874,747 B2 * | 1/2011 | Ueda | G03B 17/14 396/530 |
| 8,002,483 B2 * | 8/2011 | Fujiwara | G03B 19/12 396/530 |
| 8,639,111 B2 | 1/2014 | Imafuji et al. | |
| 8,770,868 B1 | 7/2014 | Hasuda et al. | |
| 10,228,533 B2 * | 3/2019 | Shirai | G03B 13/36 |
| 10,877,356 B2 * | 12/2020 | Funaoka | G03B 7/26 |
| 10,897,565 B2 * | 1/2021 | Takanashi | H04N 5/2254 |
| 10,928,707 B2 * | 2/2021 | Imamura | G02B 7/14 |
| 2004/0202464 A1 | 10/2004 | Miyasaka et al. | |
| 2011/0044682 A1 | 2/2011 | Kawanami | |
| 2011/0229118 A1 | 9/2011 | Imafuji | |
| 2011/0317990 A1 | 12/2011 | Imafuji | |
| 2012/0063020 A1 | 3/2012 | Imafuji et al. | |
| 2012/0066539 A1 | 3/2012 | Oikawa | |
| 2012/0219281 A1 | 8/2012 | Imafuji et al. | |
| 2013/0010134 A1 | 1/2013 | Motoki et al. | |
| 2013/0011130 A1 | 1/2013 | Kamimura | |
| 2013/0022348 A1 | 1/2013 | Hasuda et al. | |
| 2013/0077952 A1 | 3/2013 | Sugiyama et al. | |
| 2013/0077954 A1 | 3/2013 | Oikawa et al. | |
| 2013/0077955 A1 | 3/2013 | Imafuji et al. | |
| 2013/0077957 A1 | 3/2013 | Oikawa et al. | |
| 2013/0266304 A1 | 10/2013 | Nishio et al. | |
| 2014/0184893 A1 | 7/2014 | Imafuji | |
| 2014/0293122 A1 | 10/2014 | Imamura | |
| 2015/0116592 A1 | 4/2015 | Suzuki | |
| 2016/0227083 A1 | 8/2016 | Imamura et al. | |
| 2016/0227084 A1 | 8/2016 | Imamura et al. | |
| 2017/0237893 A1 | 8/2017 | Kishida et al. | |
| 2018/0348604 A1 | 12/2018 | Kamiya et al. | |
| 2018/0348607 A1 | 12/2018 | Saito | |
| 2018/0352122 A1 | 12/2018 | Yasuda et al. | |
| 2019/0037127 A1 | 1/2019 | Kawada | |
| 2020/0192193 A1 | 6/2020 | Watazawa et al. | |

FOREIGN PATENT DOCUMENTS

| | | |
|---|---|---|
| EP | 2523451 A1 | 11/2012 |
| EP | 2648042 A2 | 10/2013 |
| EP | 3410192 A1 | 12/2018 |
| JP | S63-184719 A | 7/1988 |
| JP | H01-137241 A | 5/1989 |
| JP | H07-234432 | 9/1995 |
| JP | 2000-105402 A | 4/2000 |
| JP | 2004-117380 A | 4/2004 |
| JP | 2004-361898 A | 12/2004 |
| JP | 2009-258558 A | 11/2009 |
| JP | 2010-237514 A | 10/2010 |
| JP | 2011-215594 A | 10/2011 |
| JP | 2012-032761 A | 2/2012 |
| JP | 2012-078770 A | 4/2012 |
| JP | 2012-078771 A | 4/2012 |
| JP | 2012-080513 A | 4/2012 |
| JP | 2012-098757 A | 5/2012 |
| JP | 2012-141573 A | 7/2012 |
| JP | 2012-189980 A | 10/2012 |
| JP | 2012-203020 A | 10/2012 |
| JP | 2012-237932 A | 12/2012 |
| JP | 2013-020021 A | 1/2013 |
| JP | 2013-025165 A | 2/2013 |
| JP | 2013-054122 A | 3/2013 |
| JP | 2013-054452 A | 3/2013 |
| JP | 2013-057812 A | 3/2013 |
| JP | 2013-057813 A | 3/2013 |
| JP | 2013-057866 A | 3/2013 |
| JP | 2013-057867 A | 3/2013 |
| JP | 2013-080209 A | 5/2013 |
| JP | 2013-080210 A | 5/2013 |
| JP | 2013-080211 A | 5/2013 |
| JP | 2013-080212 A | 5/2013 |
| JP | 2013-080213 A | 5/2013 |
| JP | 2013-080214 A | 5/2013 |
| JP | 2013-172195 A | 9/2013 |
| JP | 2013-214009 A | 10/2013 |
| JP | 2013-231921 A | 11/2013 |
| JP | 2013-231949 A | 11/2013 |
| JP | 2014-013331 A | 1/2014 |
| JP | 2014-021348 A | 2/2014 |
| JP | 2014-038300 A | 2/2014 |
| JP | 2014-071289 A | 4/2014 |
| JP | 2015-035002 A | 2/2015 |
| JP | 2015-099396 A | 5/2015 |
| JP | 2016-106277 A | 6/2016 |
| JP | 2017-090726 A | 5/2017 |
| JP | 2017-181980 A | 10/2017 |
| WO | 2013/039120 A1 | 3/2013 |
| WO | 2013/099788 A1 | 7/2013 |
| WO | 2013/168742 A1 | 11/2013 |
| WO | 2015/068485 A1 | 5/2015 |

OTHER PUBLICATIONS

Sep. 19, 2019 Search Report issued in European Patent Application No. 19186534.4.
Oct. 5, 2020 Notice of Allowance issued in U.S. Appl. No. 16/512,876.
Oct. 28, 2021 Office Action issued in European Patent Application No. 19186534.4.
Jun. 28, 2022 Office Action issued in Japanese Patent Application No. 2018-237284.
Feb. 22, 2022 Office Action issued in Japanese Patent Application No. 2018-237284.
Nov. 1, 2022 Office Action issued in Indian Patent Application No. 201914028579.
Aug. 15, 2023 Office Action issued in Japanese Patent Application No. 2022-103173.

* cited by examiner

ACCESSORY REMOVABLY ATTACHABLE TO A CAMERA BODY

This is a Continuation of application Ser. No. 16/512,873 filed Jul. 16, 2019 (now U.S. Pat. No. 10,877,356), which claims the benefit of Japanese Priority Application No. 2018-135199 filed Jul. 18, 2018. The disclosure of each of the prior applications is hereby incorporated by reference herein in its entirety.

TECHNICAL FIELD

The present invention relates to an accessary.

BACKGROUND ART

There have been known accessories that can be removably attached to a camera body (for example, see PTL1). The accessories have heretofore been required to be attached to a camera body in a properly useable manner.

CITATION LIST

Patent Literature

PTL1: Japanese Laid-Open Patent Publication No. 2004-117380

SUMMARY OF INVENTION

According to the 1st aspect of the present invention, an accessory removably attachable to a camera body and including a plurality of terminals, comprises: a detection terminal for causing the camera body to detect that the accessory is attached thereto; a first power supply terminal through which a first power supply voltage is supplied from the camera body; a second power supply terminal through which a second power supply voltage is supplied from the camera body; a ground terminal used as a ground potential; a ready terminal used to indicate whether or not communication with the camera body is allowed; a first clock terminal that receives a first clock signal having a first cycle from the camera body; a first data terminal that receives a first data signal from the camera body in synchronization with the first clock signal; a second data terminal that outputs a second data signal to the camera body in synchronization with the first clock signal; a second clock terminal that outputs a second clock signal having a second cycle to the camera body; a third data terminal that outputs a third data signal to the camera body in synchronization with the second clock signal; a first circuit to which the first power supply voltage is supplied through the first power supply terminal; and a second circuit to which the second power supply voltage is supplied through the second power supply terminal, wherein: the ground terminal is used as a ground potential for the first circuit and the second circuit; and a distance between the second clock terminal and the first power supply terminal is longer than a distance between the first clock terminal and the first power supply terminal.

According to the 2nd aspect of the present invention, an accessory removably attachable to a camera body and including a plurality of terminals, comprises: a detection terminal for causing the camera body to detect that the accessory is attached thereto; a power supply terminal through which a first power supply voltage is supplied from the camera body; a first ground terminal used as a ground potential; a second ground terminal used as a ground potential; a ready terminal used to indicate whether or not communication with the camera body is allowed; a first clock terminal that receives a first clock signal having a first cycle from the camera body; a first data terminal that receives a first data signal from the camera body in synchronization with the first clock signal; a second data terminal that outputs a second data signal to the camera body in synchronization with the first clock signal; a second clock terminal that outputs a second clock signal having a second cycle to the camera body; and a third data terminal that outputs a third data signal to the camera body in synchronization with the second clock signal; a voltage conversion circuit that converts the first power supply voltage into a second power supply voltage a first circuit to which the first power supply voltage is supplied through the power supply terminal; and a second circuit to which the second power supply voltage converted by the voltage conversion circuit is supplied, wherein: the first ground terminal is used as a ground potential for the first circuit; the second ground terminal is used as a ground potential for the second circuit; and a distance between the second clock terminal and the power supply terminal is longer than a distance between the first clock terminal and the power supply terminal.

According to the 3rd aspect of the present invention, an accessory removably attachable to a camera body and including a plurality of terminals, comprises: a detection terminal for causing the camera body to detect that the accessory is attached thereto; a power supply terminal through which a first power supply voltage is supplied from the camera body; a ground terminal used as a ground potential; a ready terminal used to indicate whether or not communication with the camera body is allowed; a first clock terminal that receives a first clock signal having a first cycle from the camera body; a first data terminal that receives a first data signal from the camera body in synchronization with the first clock signal; a second data terminal that outputs a second data signal to the camera body in synchronization with the first clock signal; a second clock terminal that outputs a second clock signal having a second cycle to the camera body; a third data terminal that outputs a third data signal to the camera body in synchronization with the second clock signal; a voltage conversion circuit that converts the first power supply voltage into a second power supply voltage; a first circuit to which the first power supply voltage is supplied through the power supply terminal; and a second circuit to which the second power supply voltage converted by the voltage conversion circuit is supplied, wherein: the ground terminal is used as a ground potential for the first circuit and the second circuit; and a distance between the second clock terminal and the power supply terminal is longer than a distance between the first clock terminal and the power supply terminal.

DESCRIPTION OF EMBODIMENTS

First Embodiment

Figure 1:
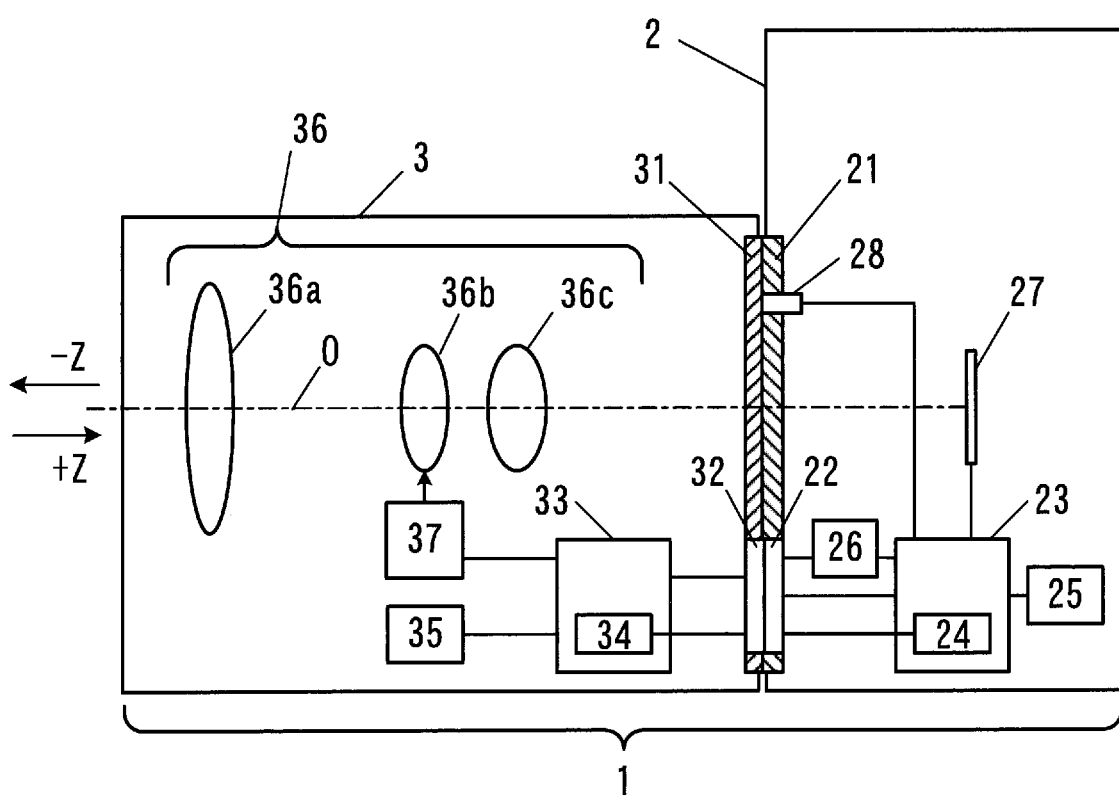
FIG. 1 schematically illustrates a configuration of a camera system.

FIG. 1 schematically illustrates a configuration of a camera system 1 according to a first embodiment. The camera system 1 includes a camera body 2 and an interchangeable lens 3, which represents an example of an accessary that can be removably attached to the camera body 2.

The interchangeable lens 3 includes a lens-side mount 31, a lens-side terminal holding unit 32, a lens-side control unit 33 including a lens-side communication unit 34, a lens-side storage unit 35, an imaging optical system 36, and a driving unit 37. The lens-side mount 31 and the lens-side terminal holding unit 32 will be described in detail later.

The lens-side control unit 33 is made up of components such as a microcomputer and its peripheral circuits. The lens-side communication unit 34 performs a data communication with the camera body 2, which will be described later. The lens-side communication unit 34 is connected to lens-side terminals (as described later) provided on the lens-side terminal holding unit 32. The lens-side storage unit 35 is a nonvolatile storage medium. The lens-side storage unit 35 is connected to the lens-side control unit 33. The lens-side storage unit 35 has pre-stored information such as a predetermined control program to be executed by the lens-side control unit 33. The lens-side control unit 33 controls the interchangeable lens 3 by reading and executing the control program from the lens-side storage unit 35.

The imaging optical system 36 forms an image of a subject on an imaging area of the image sensor 27, which will be described later. An optical axis O of the imaging optical system 36 substantially coincides with the center of the lens-side mount 31 and the center of a body-side mount 21, which will be described later. The imaging optical system 36 illustrated in FIG. 1 generally includes a lens 36a, a focus lens 36b, and a lens 36c. The focus lens 36b is a lens for adjusting the imaging position for the image of the subject. The driving unit 37 is connected to the lens-side control unit 33 and includes an actuator or the like (not illustrated). The driving unit 37 moves the focus lens 36b in the optical axis direction (+Z and −Z directions) by means of the actuator or the like.

The camera body 2 includes a body-side mount 21, a body-side terminal holding unit 22, a body-side control unit 23 including a body-side communication unit 24, a body-side storage unit 25, a power unit 26, an image sensor 27, and a switch 28 for detecting the state of a lock pin, which will be described later.

The body-side control unit 23 is made up of components such as a microcomputer and its peripheral circuits. It will be noted that the body-side control unit 23 controls various functions of a body, although only communication-related functions are described herein and other functions are omitted. The body-side communication unit 24 performs a data communication with the interchangeable lens 3, which will be described later. The body-side communication unit 24 is connected to body-side terminals (which will be described later) provided on the body-side terminal holding unit 22. Some terminals of the body-side terminal holding unit 22 are connected to the body-side control unit 23, as described later. The body-side storage unit 25 is a nonvolatile storage medium. The body-side storage unit 25 is connected to the body-side control unit 23. The body-side storage unit 25 has pre-stored information such as a predetermined control program to be executed by the body-side control unit 23. The body-side control unit 23 controls the camera body 2 by reading and executing the control program from the body-side storage unit 25.

The power unit 26 includes a power supply and supplies electric power within the camera body 2 and to the interchangeable lens 3. The power unit 26 is connected to both body-side terminals (which will be described later) provided to the body-side terminal holding unit 22 and the body-side control unit 23. The image sensor 27 is a solid-state image sensor such as CCD and CMOS, for example. The image sensor 27 is connected to the body-side control unit 23 and images a subject to output an imaging signal. Description of Processing on an Output Imaging Signal is Omitted.

Figure 2:
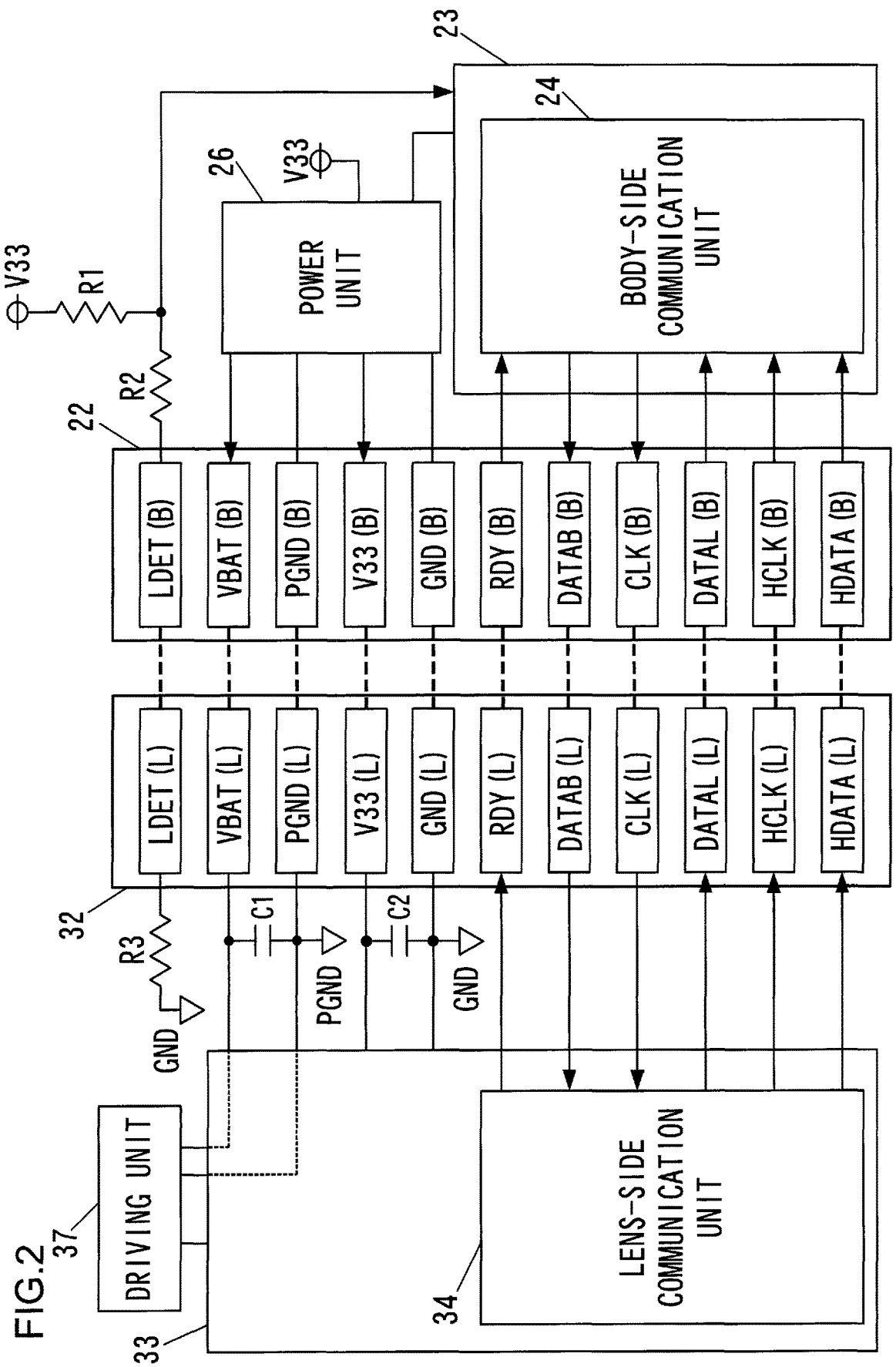
FIG. 2 is a circuit diagram schematically illustrating electrical connections between a camera body and an interchangeable lens according to a first embodiment.

FIG. 2 is a circuit diagram schematically illustrating electrical connections between the camera body 2 and the interchangeable lens 3. The body-side terminal holding unit 22 includes an LDET (B) terminal, a VBAT (B) terminal, a PGND (B) terminal, a V33 (B) terminal, a GND (B) terminal, an RDY (B) terminal, a DATAB (B) terminal, a CLK (B) terminal, a DATAL (B) terminal, an HCLK (B) terminal, and an HDATA (B) terminal. These 11 pieces of body-side terminals are collectively referred to as body-side terminals.

The LDET (B) terminal is a terminal for detecting attachment and detachment of the interchangeable lens 3. The LDET (B) terminal is connected to the body-side control unit 23 through a resistor R2. A power supply V33 from the power unit 26 is connected between the body-side control unit 23 and the resistor R2 across a resistor R1 to pull up the LDET (B) terminal.

The VBAT (B) terminal, the PGND (B) terminal, the V33 (B) terminal, and the GND (B) terminal are power supply-related terminals connected to the power unit 26. In FIG. 2, the direction of supplied power is indicated by an arrow. The VBAT (B) terminal is a terminal used for supplying power to the interchangeable lens 3. The power supplied through the VBAT (B) terminal drives the driving unit 37 of the interchangeable lens 3. The driving unit 37 requires voltage and current larger than the lens-side control unit 33 to operate: the power supply voltage applied to the VBAT (B) terminal by the power unit 26 is on the order of 10 V at the maximum. In the following description, the voltage applied to the VBAT (B) terminal by the power unit 26 is referred to as a drive-related voltage. In other words, the camera body 2 supplies a drive-related power supply voltage from the VBAT (B) terminal to the interchangeable lens 3. The PGND (B) terminal is a corresponding ground terminal to the VBAT (B) terminal and is used for a ground potential (ground) for the drive-related power supply voltage.

The V33 (B) terminal is a terminal used for supplying power to the interchangeable lens 3. The power supplied through the V33 (B) terminal from the power unit 26 is used to operate the lens-side control unit 33 and the like. The lens-side control unit 33 and the like units are operated by voltage and current smaller than the driving unit 37. The voltage applied to the V33 (B) terminal by the power unit 26 is on the order of 3.3 V at the maximum. In the following description, the voltage applied to the V33 (B) terminal by the power unit 26 is referred to as a circuit-related voltage. In other words, the camera body 2 supplies a circuit-related power supply voltage from the V33 (B) terminal to the interchangeable lens 3. The GND (B) terminal is a corresponding ground terminal to the V33 (B) terminal and is used for a ground potential (ground) for the circuit-related power supply voltage.

The RDY (B) terminal is connected to the body-side communication unit 24. The DATAB (B) terminal, the CLK (B) terminal, the DATAL (B) terminal, the HCLK (B) terminal, and the HDATA (B) terminal are communication-related terminals connected to the body-side communication unit 24. The RDY (B) terminal, the DATAB (B) terminal, the CLK (B) terminal, and the DATAL (B) terminal are used for command data communication, which will be described later. Similarly, the HCLK (B) terminal and the HDATA (B) terminal are connected to the body-side communication unit 24 and used for hot-line communication, which will be described later. In FIG. 2, the signal flow is indicated by an arrow. A potential on the RDY (B) terminal indicates whether or not the interchangeable lens 3 is ready for command data communication. The DATAB (B) terminal is a terminal from which a data signal is output to the interchangeable lens 3. The CLK (B) terminal is a terminal that outputs a clock signal (C clock signal) from the camera body 2 to the interchangeable lens 3.

The DATAL (B) terminal is a terminal to which a data signal is input from the interchangeable lens 3.

The HCLK (B) terminal is a terminal to which a clock signal (H clock signal) is input from the interchangeable lens 3. The HDATA (B) terminal is a terminal to which a data signal is input from the interchangeable lens 3.

The lens-side terminal holding unit 32 includes an LDET (L) terminal, a VBAT (L) terminal, a PGND (L) terminal, a V33 (L) terminal, a GND (L) terminal, an RDY (L) terminal, a DATAB (L) terminal, a CLK (L) terminal, a DATAL (L) terminal, an HCLK (L) terminal, and an HDATA (L) terminal. These 11 pieces of lens-side terminals are collectively referred to as lens-side terminals. Once the interchangeable lens 3 is attached to the camera body 2, the body-side terminals and the lens-side terminals are electrically connected to each other as illustrated by dashed lines in FIG. 2. Specifically, the LDET (B) terminal is connected with the LDET (L) terminal, the VBAT (B) terminal is connected with the VBAT (L) terminal, the PGND (B) terminal is connected with the PGND (L) terminal, the V33 (B) terminal is connected with the V33 (L) terminal, the GND (B) terminal is connected with the GND (L) terminal, the RDY (B) terminal is connected with the RDY (L) terminal, the DATAB (B) terminal is connected with the DATAB (L) terminal, the CLK (B) terminal is connected with the CLK (L) terminal, the DATAL (B) terminal is connected with the DATAL (L) terminal, the HCLK (B) terminal is connected with the HCLK (L) terminal, and the HDATA (B) terminal is connected with the HDATA (L) terminal. Signals input to and output from the lens-side terminals respectively correspond to those signals input to and output from the body-side terminals to be brought into contact with the corresponding lens-side terminals.

The LDET (L) terminal is a terminal used for detecting attachment and detachment of the interchangeable lens 3. The LDET (L) terminal is connected to the ground (GND) through a resistor R3. Once the interchangeable lens 3 is attached to the camera body 2, the LDET (L) terminal is electrically connected to the LDET (B) terminal, and the LDET (B) terminal is pulled down. This allows the camera body 2 to sense that the interchangeable lens 3 is attached thereto.

The VBAT (L) terminal, the PGND (L) terminal, the V33 (L) terminal, and the GND (L) terminal are power supply-related terminals that are electrically connected to the VBAT (B) terminal, the PGND (B) terminal, the V33 (B) terminal, and the GND (B) terminal, respectively. In FIG. 2, the direction of supplied power is indicated by an arrow. The driving unit 37 of the interchangeable lens 3 is driven by the power supplied through the VBAT (L) terminal. The PGND (L) terminal is a corresponding ground terminal to the VBAT (L) terminal and is used for a ground potential (ground) for the drive-related power supply voltage. Between the VBAT (L) terminal and the PGND (L) terminal, a so-called bypass capacitor C1 is connected.

The V33 (L) terminal is a terminal used for supplying power to the interchangeable lens 3. The V33 (L) terminal and the GND (L) terminal are connected to the lens-side control unit 33 and the like units. The power supplied through the V33 (B) terminal from the power unit 26 is used to operate the lens-side control unit 33 and the like. The GND (L) terminal is a corresponding ground terminal to the V33 (B) terminal and is used for a ground potential (ground) for the circuit-related power supply voltage. Between the V33 (L) terminal and the GND (L) terminal, a bypass capacitor C2 is connected.

The RDY (L) terminal is connected to the body-side communication unit 24 through the RDY (B) terminal. The DATAB (L) terminal, the CLK (L) terminal, the DATAL (L) terminal, the HCLK (L) terminal, and HDATA (L) terminal are communication-related terminals that are electrically connected to the DATAB (B) terminal, the CLK (B) terminal, the DATAL (B) terminal, the HCLK (B) terminal, and the HDATA (B) terminal, respectively. The RDY (L) terminal, the DATAB (L) terminal, the CLK (L) terminal, and the DATAL (L) terminal are used for the command data communication, which will be described later. The HCLK (L) terminal and the HDATA (L) terminal are used for the hot-line communication, which will be described later.

The VBAT (L) terminal and the PGND (L) terminal are connected to the driving unit 37 via the lens-side control unit 33. The V33 (L) terminal and the GND (L) terminal are connected to the lens-side control unit 33 and the like units. The RDY (L) terminal, the DATAB (L) terminal, the CLK (L) terminal, the DATAL (L) terminal, the HCLK (L) terminal, and the HDATA (L) terminal are each connected to the lens-side communication unit 34.

Description of Command Data Communication

Communication to transmit a control command (command) and control contents (control data) from the body-side control unit 23 to the lens-side control unit 33 of the interchangeable lens 3, and to transmit response contents (response data) and other data or the like from the lens-side control unit 33 to the body-side control unit 23 is referred to as command data communication. The command data communication is a full duplex communication. Through the body-side communication unit 24 and the lens-side communication unit 34, the command data communication is performed by means of a digital data communication using the RDY (B) terminal, the RDY (L) terminal, the DATAB (B) terminal, the DATAB (L) terminal, the CLK (B) terminal, the CLK (L) terminal, the DATAL (B) terminal, and the DATAL (L) terminal.

The body-side control unit 23 transmits and receives various information with the interchangeable lens 3 by transmitting various control commands and control contents to the interchangeable lens 3 by means of the command data communication via the body-side communication unit 24 and the lens-side communication unit 34, and receiving response contents and other data or the like from the interchangeable lens 3. The control commands referenced herein include a transmission command for lens information, for example. Various information received from the interchangeable lens 3 includes type information of the interchangeable lens 3, information indicative of optical properties such as focal length of the imaging optical system 36 and the like, for example. Various information transmitted to the interchangeable lens 3 includes control commands such as a command to drive the lens, control contents such as an amount of drive of a lens, type information of the camera body 2 and the like, for example. The control commands also include a drive command for the focus lens 36b and the like. By means of the command data communication, the lens-side control unit 33 receives various control commands from the body-side control unit 23, acquires control contents from the body-side control unit 23, or transmits response contents (for example, information on execution status of an initialization process such as "under initialization" and "initialization completed" in response to a control command for initialization from the camera body 2) to the body-side control unit 23.

Figure 3:
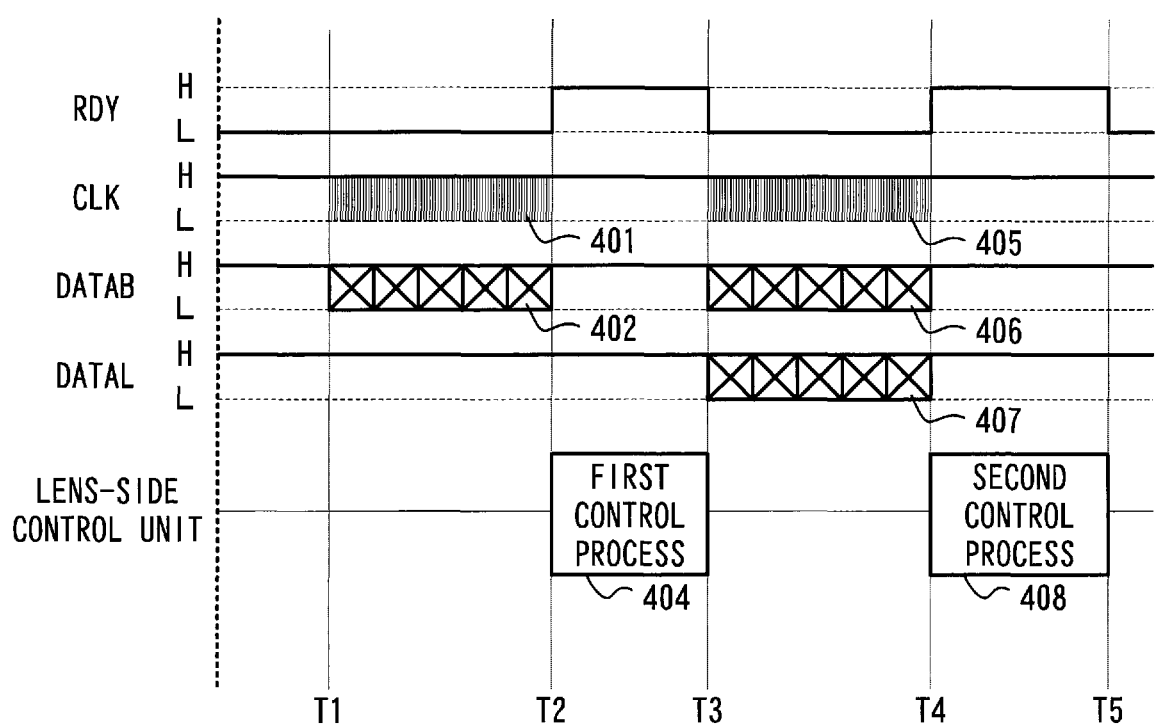
FIG. 3 is a timing chart illustrating an example of command data communication.

FIG. 3 is an example of timing chart illustrating timings of command data communication. First, the body-side control unit 23 verifies a signal level on the RDY (B) terminal at the beginning of the command data communication (T1). The signal level on the RDY (B) terminal indicates whether or not the lens-side control unit 33 is ready for the command data communication. The lens-side control unit 33 sets the signal level (or potential) on the RDY (L) terminal to a high level (H-level) if it is not ready for the command data communication. The lens-side control unit 33 sets the signal level (or potential) on the RDY (L) terminal to a low level (L-level) through the lens-side communication unit 34 if it is ready for the command data communication.

At the beginning of the command data communication (T1), the body-side control unit 23 outputs a C clock signal 401 through the body-side communication unit 24 from the CLK (B) terminal if the signal level on the RDY (B) terminal is at the low level (L-level). In other words, the body-side control unit 23 transmits the C clock signal 401 to the lens-side control unit 33 through the CLK (B) terminal and the CLK (L) terminal. A cyclic frequency of high and low levels of the C clock signal 401 in FIG. 3 is 8 MHz, for example. In synchronization with the C clock signal 401, the body-side control unit 23 outputs a body-side command signal 402, one of control commands, from the DATAB (B) terminal. In other words, the body-side control unit 23 transmits the body-side command signal 402 to the lens-side control unit 33 through the DATAB (B) terminal and the DATAB (L) terminal. The body-side command signal 402, which is indicated by switched high and low levels of DATAB in FIG. 3, is a signal indicative of a control that the body-side control unit 23 commands the lens-side control unit 33 by means of the command data communication. For example, the body-side command signal 402 may be a signal indicative of a request for type information of the interchangeable lens 3 or may be a signal indicative of a command to drive the focus lens 36b. As illustrated in FIG. 3, a timing at which the body-side command signal 402 is transmitted is different from the cycle of the C clock signal 401. The command signal 402 is periodically transmitted for an initialization process executed upon powering the camera system 1 (power-on) or for an ending process upon powering off, at intervals of a minimum of 8 ms, and otherwise, transmitted at any timing.

Upon reception of the body-side command signal 402 through the lens-side communication unit 34, the lens-side control unit 33 uses an error detecting code (for example, checksum data) included in the body-side command signal 402 to execute a checking process for checking for a communication error in the body-side command signal 402. The lens-side control unit 33 then sets the signal level on the RDY (L) terminal to the high level (H-level) (T2). The body-side control unit 23 does not transmit the C clock signal or transmit the body-side command signal 402 if the signal level on the RDY (B) terminal is at the high level.

The lens-side control unit 33 starts a first control process 404 based on a command from the received body-side command signal 402.

Upon completion of the first control process 404, the lens-side control unit 33 sets the signal level on the RDY (L) terminal to the low level (L-level) through the lens-side communication unit 34 (T3). In response to the signal level on the RDY (B) terminal setting to the low level, the body-side control unit 23 outputs a C clock signal 405 from the CLK (B) terminal. A cyclic frequency of high and low levels of the C clock signal 405 is the same as the C clock signal 401 and is 8 MHz, for example. In other words, the body-side control unit 23 transmits the C clock signal 405 through the CLK (B) terminal and the CLK (L) terminal to the lens-side control unit 33.

In addition, the body-side control unit 23 does not transmit or receive a body-side data signal 406 and a lens-side data signal 407, if the signal level on the RDY (B) terminal is at the high level.

In synchronization with the C clock signal 405, the body-side control unit 23 outputs a body-side data signal 406 from the DATAB (B) terminal through the body-side communication unit 24. In other words, the body-side control unit 23 transmits the body-side data signal 406 to the lens-side control unit 33 through the DATAB (B) terminal and the DATAB (L) terminal. The body-side data signal 406 is a signal indicative of a control parameter for the body-side command signal 402. For example, in the case where the body-side command signal 402 is a signal indicative of a command to drive the focus lens 36b, the corresponding body-side data signal 406 may be a signal indicative of the amount of drive of the focus lens 36b. Alternatively, the body-side data signal 406 may be a signal indicative of information required by the lens-side control unit 33 in the command data communication, such as type information of the camera body.

Upon input of the C clock signal 405 to the CLK (L) terminal, the lens-side control unit 33 outputs the lens-side data signal 407 from the DATAL (L) terminal in synchronization with the C clock signal 405. The lens-side data signal 407, which is indicated by switched high and low levels of DATAL in FIG. 3, is a signal transmitted by the lens-side control unit 33 to the body-side control unit 23 by means of the command data communication. For example, in the case where the body-side command signal 402 is a signal indicative of a request for type information of the interchangeable lens 3, the corresponding lens-side data signal 407 may be a signal indicative of the type information of the interchangeable lens 3. As illustrated in FIG. 3, timings at which the body-side data signal 406 and the lens-side data signal 407 are transmitted is different from the cycle of the C clock signal 405. The body-side data signal 406 and the lens-side data signal 407 are periodically transmitted for an initialization process executed upon powering the camera system 1 (power-on) or for an ending process upon powering off at intervals of a minimum of 8 ms, and otherwise, transmitted at any timing.

Upon completion of the transmission of the lens-side data signal 407, the lens-side control unit 33 again sets the signal level on the RDY (L) terminal to the high level (T4). The lens-side control unit 33 starts a second control process 408 (which will be described later) based on an indication from the received body-side data signal 406.

The first and second control processes 404 and 408 executed by the lens-side control unit 33 will now be described. For example, description will now be made as to the case where the received body-side command signal 402 contains a request for particular information on the interchangeable lens 3. As the first control process 404, the lens-side control unit 33 executes a process for generating requested information as the lens-side data signal 407. The lens-side data signal 407 generated in the first control process 404 is transmitted to the body-side communication unit 24 of the body-side control unit 23 through the lens-side communication unit 34, the DATAL (L) terminal, and the DATAL (B) terminal.

For example, description will now be made as to the case where the received body-side command signal 402 contains a signal indicative of a command to drive the focus lens 36b. As the first control process 404, the lens-side control unit 33 executes a process for generating a signal indicative of the reception of the signal indicative of a command to drive the focus lens 36b. The signal generated in the first control process 404 is transmitted as the lens-side data signal 407 to the body-side communication unit 24 of the body-side control unit 23 through the lens-side communication unit 34, the DATAL (L) terminal, and the DATAL (B) terminal. As the second control process 408, the lens-side control unit 33 executes a process for driving the focus lens 36b by the amount of drive specified in the body-side data signal 406.

Upon completion of the second control process 408, the lens-side control unit 33 sets the signal level on the RDY (L) terminal to the low level through the lens-side communication unit 34 (T5).

Communication conducted in the above timings T1 to T5 constitutes one period of the command data communication. In one period of the command data communication, the body-side command signal 402 and the body-side data signal 406 are transmitted by the body-side control unit 23. In other words, a combination of the body-side command signal 402 and the body-side data signal 406 constitutes one control command (command) and control contents (control data).

As described above, the lens-side control unit 33 receives the control command (command) and control contents (control data) from the body-side control unit 23 and transmits response contents (response data) to the body-side communication unit 24 in parallel. In other words, the command data communication is a so-called full duplex communication.

Description of Hot-Line Communication

There is provided another communication path on which data is transmitted in one direction from the lens-side control unit 33 of the interchangeable lens 3 to the body-side control unit 23 of the camera body 2, which is referred to as hot-line communication. The hot-line communication refers to data communication between the body-side control unit 23 and the lens-side control unit 33 through the body-side communication unit 24 and the lens-side communication unit 34 by means of the HCLK (B) terminal, the HCLK (L) terminal, the HDATA (B) terminal, and the HDATA (L) terminal. The body-side control unit 23 acquires information related to a state of the interchangeable lens 3 from the lens-side control unit 33 of the interchangeable lens 3 by means of the hot-line communication. The information related to a state of the interchangeable lens 3 may be, for example, a position of the focus lens 36b, a position of an image blur correction lens (or a vibration reduction lens) (not illustrated), and a position where a diaphragm is driven. The image blur correction lens is a member that can be moved (driven) to contain components perpendicular to the direction of the optical axis, and the diaphragm is a member that can be moved (driven) to change the size of an aperture through which light flux passes. In the hot-line communication, once a command to start communication is transmitted from the camera body in the command data communication, the lens-side control unit 33 autonomously transmits lens data to the body-side control unit 23 irrespective of (independently of) the command data communication until a command to end the communication is arrived.

Figure 4:
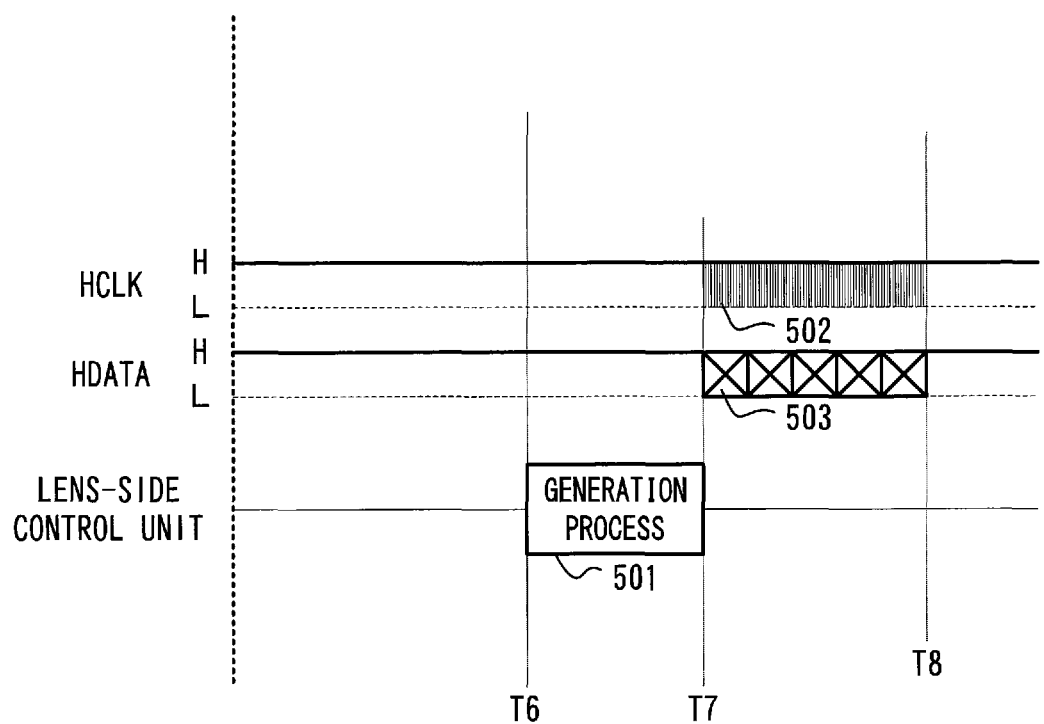
FIG. 4 is a timing chart illustrating examples of hot-line communication.

FIG. 4 is a timing chart illustrating timings of hot-line communication. Upon reception of a command to start the hot-line communication from the body-side control unit 23 of the camera body in the command data communication (T6), the lens-side control unit 33 executes a generation process 501. The generation process 501 refers to a process in which a state of a lens is acquired with a sampling period of, for example, 1 ms and a lens signal 503 for the hot-line communication is generated. Upon completion of the generation of the lens signal 503 (T7), the lens-side control unit 33 outputs an H clock signal 502 through the lens-side communication unit 34 from the HCLK (L) terminal. In other words, the H clock signal 502 is transmitted to the body-side control unit 23 through the HCLK (L) terminal and HCLK (B) terminal. A cyclic frequency of high and low levels of the H clock signal 502 in FIG. 4 is 2.5 MHz to 8 MHz, for example. Specifically, the frequency of the H clock signal 502 for the hot-line communication is equal to or lower than the frequency of the C clock signal 401 for the command data communication. In other words, the cycle of the H clock signal 502 for the hot-line communication is equal to or longer than the cycle of the C clock signal 401 for the command data communication.

The lens-side control unit 33 outputs the lens signal 503 (for example, information related to a position of the focus lens 36b) generated in the generation process 501 through the lens-side communication unit 34 from the HDATA (L)

terminal in synchronization with the H clock signal 502. In other words, the lens-side control unit 33 transmits the lens signal 503 to the body-side communication unit 24 of the body-side control unit 23 through the lens-side communication unit 34, the HDATA (L) terminal, and the HDATA (B) terminal. The lens signal 503, which is indicated by switched high and low levels of HDATA in FIG. 4, is a signal transmitted by the lens-side control unit 33 to the body-side control unit 23 by means of the hot-line communication. The output of the H clock signal 502 and the lens signal 503 ends at a timing T8.

The lens-side control unit 33 repeats the transmission of the lens data in the hot-line communication every certain period (for example, for every 1 ms) until a command to end the transmission of the lens signal 503 is received by means of the command data communication. As illustrated in FIG. 4, a timing at which lens data is transmitted by means of the hot-line communication is different from the cycle of the H clock signal 502. An interval for transmitting the lens data by means of the hot-line communication is shorter than the interval for transmitting or receiving a control command (command) and control contents (control data) by means of the command data communication, as described above.

All or a part of the command data communication and the hot-line communication can be performed in parallel. In other words, the body-side control unit 23 and the lens-side control unit 33 can start or end the hot-line communication during the command data communication. Similarly, they can start or end the command data communication during the hot-line communication.

As described above, in the hot-line communication, the communication is performed independently of the command communication. The lens-side control unit 33 transmits information related to a state of the interchangeable lens 3 to the body-side control unit 23 irrespective of the command communication by means of the hot-line communication. Consequently, the body-side control unit 23 can continuously grasp the state of the interchangeable lens 3 even during the command communication. In this way, the body-side control unit 23 can continuously grasp the position of the focus lens 36*b*, and thus can control auto-focusing at high speed, for example. The same applies to an image blur correction control (or a vibration reduction control) and a diaphragm control.

The body-side control unit 23 can provide various commands for the interchangeable lens 3 by means of the command communication in any timing even while the lens-side control unit 33 is performing the hot-line communication.

Description of Lens Mount Mechanism

The camera system 1 of the embodiment includes a lens mount mechanism of a so-called bayonet type. Description will now be made as to a body-side mount 21 on the camera body 2 and a lens-side mount 31 on the interchangeable lens 3 in order.

Figure 5A:
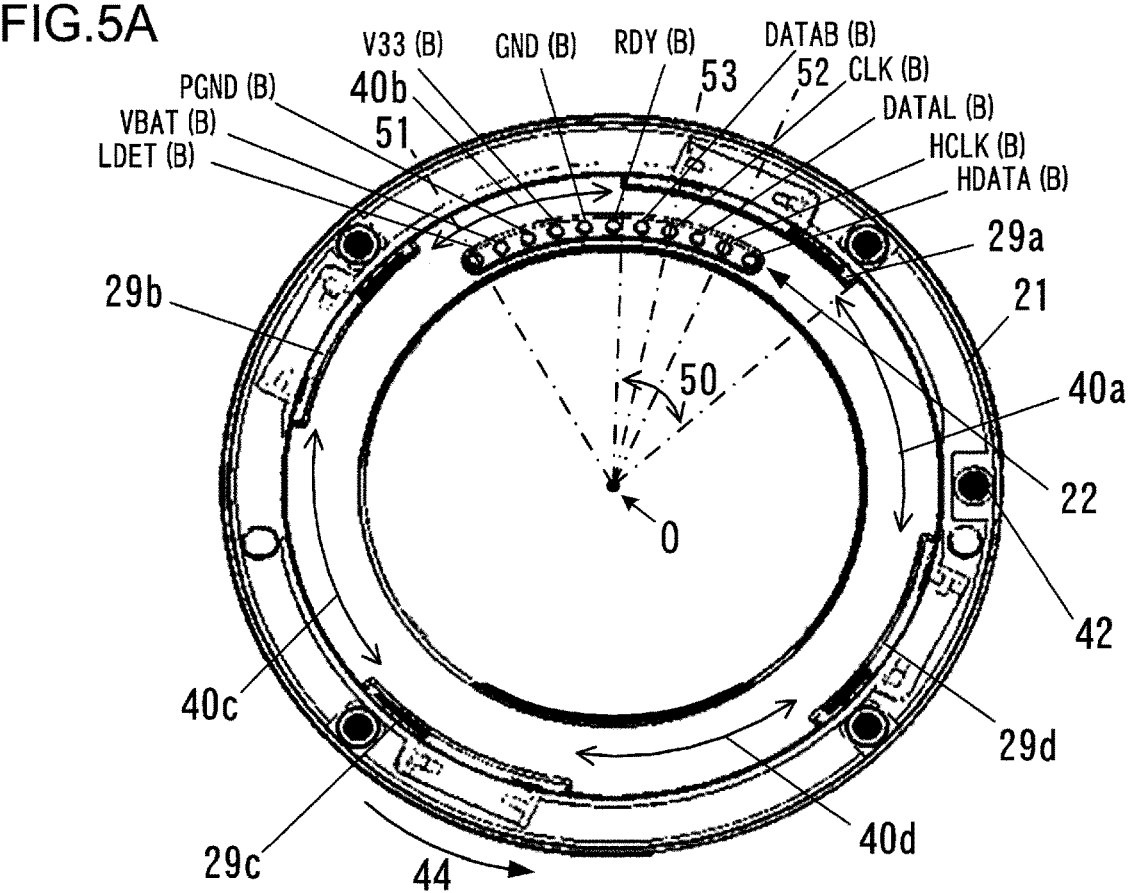
FIGS. 5A and 5B present front views schematically illustrating a mount surface of the camera body as viewed from the side of the interchangeable lens.

FIG. 5A schematically illustrates a mount of the camera body 2 as viewed from the side of the interchangeable lens 3. The camera body 2 includes the body-side mount 21 and the body-side terminal holding unit 22 as described with reference to FIG. 1. The body-side mount 21 has a reference plane of a ring shape that has a constant width. The body-side mount 21 also includes a first body-side claw 29*a*, a second body-side claw 29*b*, a third body-side claw 29*c*, and a fourth body-side claw 29*d*. In the following description, these four claws are collectively referred to as body-side claws 29. The term "claw" may be referred to as "tab" in the above and the following descriptions.

The body-side claws 29 are spaced apart from each other along a circular opening in the body-side mount 21. As illustrated in FIG. 5A, the first body-side claw 29*a* is located at an upper right position, the second body-side claw 29*b* is located at an upper left position, the third body-side claw 29*c* is located at a lower left position, and the fourth body-side claw 29*d* is located at a lower right position.

The length of each of the first to fourth body-side claws 29*a* to 29*d* in a circumferential direction is different from each other. Specifically, the first body-side claw 29*a* is the longest, the third body-side claw 29*c* is the second longest, the fourth body-side claw 29*d* is the third longest, and the second body-side claw 29*b* is the shortest.

The body-side claws 29 protrude from the body-side mount 21 toward the center of the opening and there are sections with body-side claws 29 and sections without body-side claws 29 on the circumstance of the opening. In the following description, a space 40*a* between the first body-side claw 29*a* and the fourth body-side claw 29*d* on the circumstance of the opening in the body-side mount 21 is referred to as a first body-side insertion-extraction section 40*a*. Similarly, a space 40*b* between the first body-side claw 29*a* and the second body-side claw 29*b* is referred to as a second body-side insertion-extraction section 40*b*, a space 40*c* between the second body-side claw 29*b* and the third body-side claw 29*c* is referred to as a third body-side insertion-extraction section 40*c*, and a space 40*d* between the third body-side claw 29*c* and the fourth body-side claw 29*d* is referred to as a fourth body-side insertion-extraction section 40*d*. These four body-side insertion-extraction sections are collectively referred to as body-side insertion-extraction sections 40. The term "insertion-extraction section" may be referred to as "through section".

The body-side mount 21 is provided thereinside with the body-side terminal holding unit 22. The body-side terminal holding unit 22 has an arc shape corresponding to the shape of the ring-shaped body-side mount 21. Preferably, the body-side terminal holding unit 22 is located on an upper portion of the opening in the body-side mount 21 along the opening in the body-side mount 21, in the center of the upper portion as illustrated in FIG. 5A. The body-side terminal holding unit 22 includes a plurality of body-side terminals as described above. The plurality of body-side terminals are arranged in the body-side terminal holding unit 22 arcuately in one line inside the body-side mount 21. As illustrated in FIG. 5A, the plurality of body-side terminals include 11 pieces of terminals arranged from right: HDATA (B), HCLK (B), DATAL (B), CLK (B), DATAB (B), RDY (B), GND (B), V33 (B), PGND (B), VBAT (B), and the leftmost LDET (B). Every body-side terminal is a conductive pin. The body-side terminals are under pressure by a spring or the like (not illustrated) in the −Z direction (FIG. 1). The −Z direction is a direction toward the interchangeable lens 3 attached to the camera and also a direction of a subject.

The body-side mount 21 includes a hole that a lock pin 42 passes through. The hole that the lock pin 42 passes through is located to the upper right of the fourth body-side claw 29*d*. In other words, the hole for the lock pin 42 is located in the ring-shaped reference plane between an area where the fourth body-side claw 29*d* is present and an area where the first body-side claw 29*a* is present in the opening in the body-side mount 21. The lock pin 42 is under pressure by a spring or the like (not illustrated) in the −Z direction (FIG. 1).

Figure 5B:
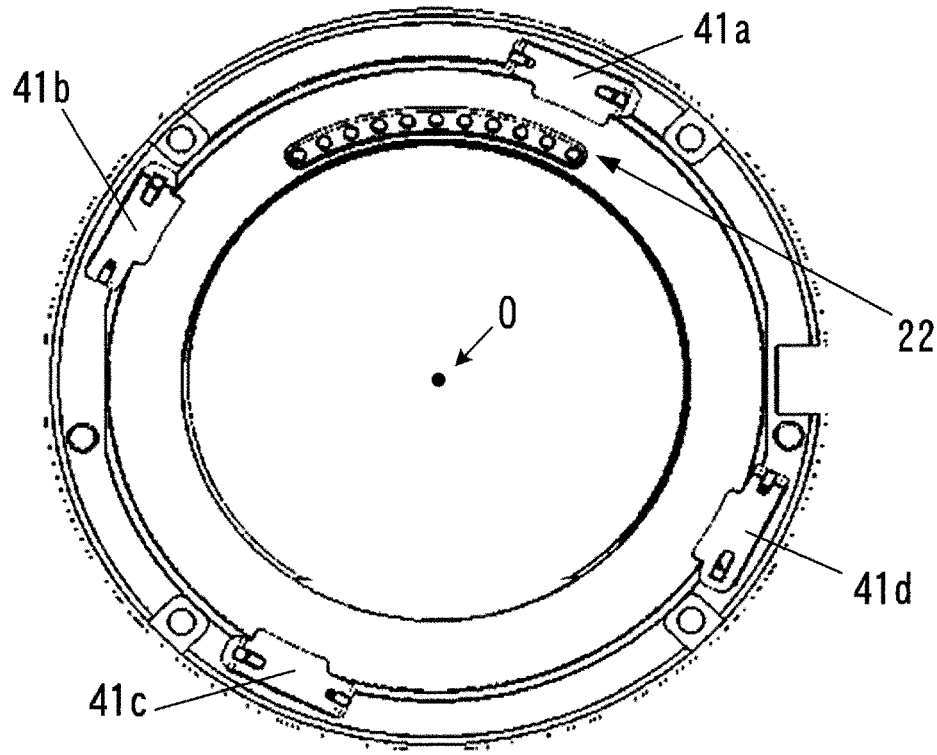

FIG. 5B is a schematic drawing illustrating the mount of the camera body 2 with the body-side mount 21 removed as viewed from the side of the interchangeable lens 3. A first flat spring 41a is provided in a position corresponding to the first body-side claw 29a (behind the first body-side claw 29a). Similarly, a second flat spring 41b is provided in a position corresponding to the second body-side claw 29b (behind the second body-side claw 29b), a third flat spring 41c is provided in a position corresponding to the third body-side claw 29c (behind the third body-side claw 29c), and a fourth flat spring 41d is provided in a position corresponding to the fourth body-side claw 29d (behind the fourth body-side claw 29d). In the following description, these four flat springs are collectively referred to as flat springs 41. The flat springs 41 press the lens-side claws described later in the +Z direction (toward the camera body 2).

Figure 6:
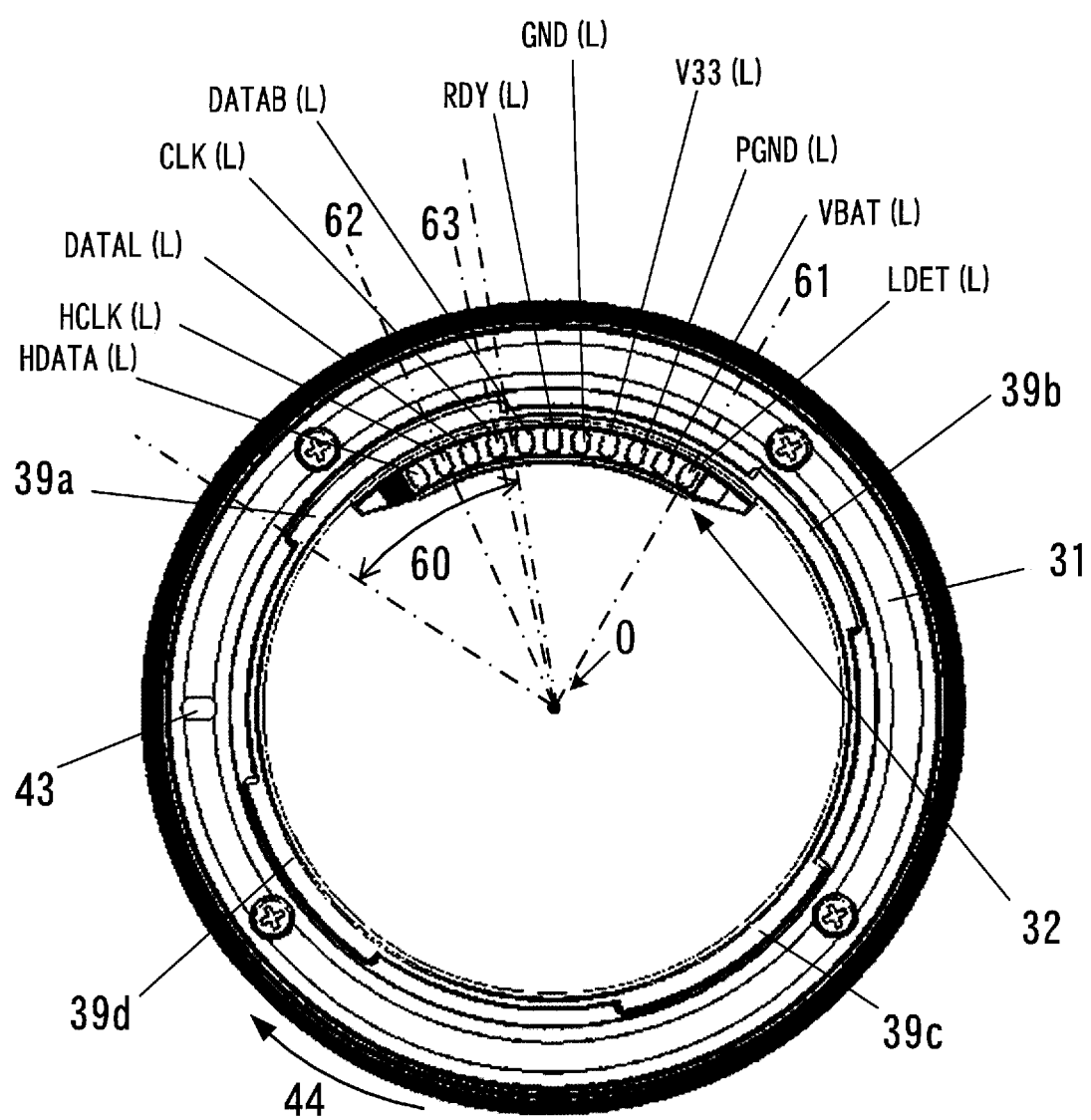
FIG. 6 is a front view schematically illustrating a mount surface of the interchangeable lens as viewed from the side of the camera body.

FIG. 6 schematically illustrates a mount of the interchangeable lens 3 as viewed from the side of the camera body 2. The interchangeable lens 3 includes the lens-side mount 31 and the lens-side terminal holding unit 32 as described with reference to FIG. 1. The lens-side mount 31 has a reference plane of a ring shape that has a constant width. Once the interchangeable lens 3 is attached to the camera body 2, the ring-shaped reference plane of the lens-side mount 31 is in contact with the ring-shaped reference plane of the body-side mount 21 described above. In addition, the lens-side mount 31 includes a cylindrical section extending in the optical axis direction on its inner circumstance. Along the outer circumstance of the cylindrical section, the lens-side mount 31 includes a first lens-side claw 39a, a second lens-side claw 39b, a third lens-side claw 39c, and a fourth lens-side claw 39d that are spaced apart from each other. In the following description, these four claws are collectively referred to as lens-side claws 39.

The lens-side claws 39 protrude from the outer circumstance of the cylindrical section of the lens-side mount 31 outward of the mount (radially from the optical axis O). As illustrated in FIG. 6, the first lens-side claw 39a is located at an upper left position, the second lens-side claw 39b is located at an upper right position, the third lens-side claw 39c is located at a lower right position, and the fourth lens-side claw 39d is located at a lower left position. Behind each of the lens-side claws 39 (on the side of the reference plane of the lens-side mount 31), there is a space where the corresponding one of body-side claws 29 enters once the interchangeable lens 3 is attached to the camera body 2.

The lens-side mount 31 is provided thereinside with the lens-side terminal holding unit 32. The lens-side terminal holding unit 32 has an arc shape corresponding to the shape of the ring-shaped lens-side mount 31. Preferably, the lens-side terminal holding unit 32 is located on an upper portion of the lens-side mount 31 along the opening in the lens-side mount 31, in the center of the upper portion as illustrated in FIG. 6. The lens-side terminal holding unit 32 includes a plurality of lens-side terminals as described above. The plurality of lens-side terminals are arranged in the lens-side terminal holding unit 32 arcuately in one line inside the lens-side mount 31. As illustrated in FIG. 6, the plurality of lens-side terminals include 11 pieces of terminals arranged from right: LDET (L), VBAT (L), PGND (L), V33 (L), GND (L), RDY (L), DATAB (L), CLK (L), DATAL (L), HCLK (L), and HDATA (L). The lens-side terminals are arranged such that a conductive contact surface of each terminal is exposed in the +Z direction (FIG. 1). The +Z direction is a direction in which light from a subject passing through the imaging optical system 36 travels toward the image sensor 27.

The lens-side mount 31 includes a lock pin receiving section 43. As illustrated in FIG. 6, the lock pin receiving section 43 is located to the upper left of the fourth lens-side claw 39d. In other words, the lock pin receiving section 43 is located between a portion corresponding to the first lens-side claw 39a and a portion corresponding to the fourth lens-side claw 39d in the lens-side mount 31. The lock pin receiving section 43 is a groove accommodating the lock pin 42 once the interchangeable lens 3 is attached to the camera body 2. The groove is provided in the −Z direction (FIG. 1).

Once the interchangeable lens 3 is attached to the camera body 2, the plurality of body-side terminals are physically in contact with their respective corresponding lens-side terminals. The contact electrically connects the plurality of body-side terminals with the plurality of lens-side terminals. In other words, the plurality of body-side terminals and the plurality of lens-side terminals are in electrical continuity with each other.

Attachment of Interchangeable Lens

Description will now be made as to how the interchangeable lens 3 is attached to the camera body 2. To attach the interchangeable lens 3 to the camera body 2, first the body-side mount 21 is placed face to face with the lens-side mount 31, then the first lens-side claw 39a is aligned with the first body-side insertion-extraction section 40a, the second lens-side claw 39b is aligned with the second body-side insertion-extraction section 40b, the third lens-side claw 39c is aligned with the third body-side insertion-extraction section 40c, and the fourth lens-side claw 39d is aligned with the fourth body-side insertion-extraction section 40d. Then, the first lens-side claw 39a is inserted into the first body-side insertion-extraction section 40a, the second lens-side claw 39b is inserted into the second body-side insertion-extraction section 40b, the third lens-side claw 39c is inserted into the third body-side insertion-extraction section 40c, and the fourth lens-side claw 39d is inserted into the fourth body-side insertion-extraction section 40d. At this time, the LDET (L) terminal is brought into contact with the CLK (B) terminal, the VBAT (L) terminal is brought into contact with the DATAL (B) terminal, the PGND (L) terminal is brought into contact with the HCLK (B) terminal, and the V33 (L) terminal is brought into contact with the HDATA (B) terminal.

From this state, the interchangeable lens 3 is rotated in an attachment direction 44 as illustrated in FIGS. 5A and 6. Consequently, the first body-side claw 29a enters a space behind the first lens-side claw 39a, the second body-side claw 29b enters a space behind the second lens-side claw 39b, the third body-side claw 29c enters a space behind the third lens-side claw 39c, and the fourth body-side claw 29d enters a space behind the fourth lens-side claw 39d. At this time, the plurality of lens-side terminals are brought into contact with the plurality of body-side terminals in order. Instead of the interchangeable lens 3, the camera body 2 may be rotated in the reverse direction with respect to the attachment direction 44 illustrated in FIGS. 5A and 6.

While the lens-side claws 39 are inserted in their corresponding body-side insertion-extraction sections 40 and the interchangeable lens 3 is rotated in the attachment direction 44, for example, the LDET (L) terminal is brought into contact with the CLK (B) terminal, the DATAB (B) terminal, the RDY (B) terminal, the GND (B) terminal, the V33 (B) terminal, the PGND (B) terminal, the VBAT (B) terminal and the LDET (B) terminal, in order. For example, the VBAT (L) terminal is brought into contact with the DATAL (B) terminal, the CLK (B) terminal, the DATAB (B) terminal, the RDY (B) terminal, the GND (B) terminal, the V33 (B) terminal, the PGND (B) terminal, and the VBAT (B) terminal, in order. For example, the PGND (L) terminal is brought into contact with the HCLK (B) terminal, the DATAL (B) terminal, the CLK (B) terminal, the DATAB (B) terminal, the RDY (B) terminal, the GND (B) terminal, the V33 (B) terminal, and the PGND (B) terminal, in order. For example, the V33 (L) terminal is brought into contact with the HDATA (B) terminal, the HCLK (B) terminal, the DATAL (B) terminal, the CLK (B) terminal, the DATAB (B) terminal, the RDY (B) terminal, the GND (B) terminal, and the V33 (B) terminal, in order. For example, the GND (L) terminal is brought into contact with the HDATA (B) terminal, the HCLK (B) terminal, the DATAL (B) terminal, the CLK (B) terminal, the DATAB (B) terminal, the RDY (B) terminal, and the GND (B) terminal, in order.

For example, the RDY (L) terminal is brought into contact with the HDATA (B) terminal, the HCLK (B) terminal, the DATAL (B) terminal, the CLK (B) terminal, the DATAB (B) terminal, and the RDY (B) terminal, in order. For example, the DATAB (L) terminal is brought into contact with the HDATA (B) terminal, the HCLK (B) terminal, the DATAL (B) terminal, the CLK (B) terminal, and the DATAB (B) terminal, in order. For example, the CLK (L) terminal is brought into contact with the HDATA (B) terminal, the HCLK (B) terminal, the DATAL (B) terminal, and the CLK (B) terminal, in order. For example, the DATAL (L) terminal is brought into contact with the HDATA (B) terminal, the HCLK (B) terminal, and the DATAL (B) terminal, in order. For example, the HCLK (L) terminal is brought into contact with the HDATA (B) terminal and the HCLK (B) terminal, in order.

Upon rotating the interchangeable lens 3 by a predetermined angle with respect to the camera body 2, an attachment completion position is reached. In the attachment completion position, the body-side claws 29 and the lens-side claws 39 are placed face to face with each other in the optical axis direction, and the lock pin 42 is pushed in the −Z direction in FIG. 1 into the lock pin receiving section 43. Once the lock pin 42 enters the lock pin receiving section 43, the interchangeable lens 3 cannot be rotated with respect to the camera body 2 to remove the lens. In other words, once the body-side claws 29 and the lens-side claws 39 reach a predetermined attachment completion position, the relative position between the body-side mount 21 and the lens-side mount 31 is fixed. The lens-side claws 39 are pressed to the body side (+Z direction in FIG. 1) by the flat springs 41. In this way, each of the plurality of lens-side terminals is in contact with and electrically connected to each of their respective corresponding body-side terminals.

In the following description, the state where the body-side claws 29 and the lens-side claws 39 reach the attachment completion position is referred to as an attachment completion state. During rotation from the position where the lens-side claw 39 is inserted into the body-side insertion-extraction section 40 to a position immediately before the attachment completion position or during rotation from a position immediately before the attachment completion position to the insertion position is referred to as an attachment incompletion state (or an attachment in-process state).

During the attachment incompletion state, the signal level of the LDET (B) terminal is pulled up and at a high level. While it is detected that the signal level of the LDET (B) terminal is at a high level, the body-side control unit 23 determines that the interchangeable lens 3 is not attached. While the interchangeable lens 3 is not attached, the body-side control unit 23 does not allow the power unit 26 to supply power to the VBAT (B) terminal and the V33 (B) terminal.

In the attachment completion state, the signal level of the LDET (B) terminal is pull down to a low level as described above (FIG. 2). Upon detection of the signal level of the LDET (B) terminal reaching a low level, the body-side control unit 23 determines that the interchangeable lens 3 is attached. Also in the attachment completion state, the lock pin 42 enters the lock pin receiving section 43 and a switch 28 (FIG. 1) associated with the lock pin 42 is turned on. Upon detection of the signal level of the LDET (B) terminal reaching a low level and the switch 28 being turned on, the body-side control unit 23 causes the power unit 26 to start supplying power, that is, to supply the circuit-related power supply voltage to the V33 (B) terminal. It will be noted that the camera body 2 is not necessarily provided with the switch 28. In the case where the switch 28 is not provided, the power unit 26 may be allowed to supply power to the V33 (B) terminal upon detection of the signal level of the LDET (B) terminal reaching a low level.

Once the supply of power to the V33 (B) terminal is started, power supply voltage is supplied to the lens-side control unit 33 of the interchangeable lens 3 through the V33 (L) terminal and the lens-side control unit 33 starts operation. The lens-side control unit 33, that has started operation, permits initial communication with the body-side control unit 23 by means of the command data communication. After the lens-side control unit 33 permits initial communication, the body-side control unit 23 starts the initial communication. The initial communication includes a request for a power supply to the VBAT (L) terminal by the lens-side control unit 33. Once a signal requesting for a power supply to the VBAT (L) terminal is transmitted from the lens-side control unit 33 to the body-side control unit 23, the body-side control unit 23 supplies power supply voltage to the VBAT (B) terminal and an initialization process between the camera body 2 and the interchangeable lens 3 is executed. In the initialization process, information required for various operations of the camera system 1, such as imaging operation and focus adjustment, is exchanged between the camera body 2 and the interchangeable lens 3, a lens position of the interchangeable lens is transferred to a reference position, and so on.

In the attachment completion state, upon an unlocking button (not illustrated) of the camera body being pressed by a user, the lock pin 42 retracts from the lock pin receiving section 43. This allows the relative position between the body-side mount 21 and the lens-side mount 31 to be changed. Upon an unlocking button (not illustrated) being pressed by a user to turn off the switch 28 associated with the unlocking button, the body-side control unit 23 causes the power unit 26 to stop supplying power to the VBAT (B) terminal and the V33 (B) terminal. From that state, while the interchangeable lens 3 is rotated in a direction opposite to the attachment direction 44 as illustrated in FIGS. 5A and 6, the plurality of lens-side terminals are brought into contact with the plurality of body-side terminals in the reverse order to that as described above.

The supply of power may not be stopped in response to the operation of the unlocking button. In this case, upon detection of the signal level of the LDET (B) terminal changing from the low level to the high level because the LDET (L) terminal is separated from the LDET (B) terminal due to the rotation of the interchangeable lens 3 in the direction opposite to the attachment direction 44, the body-side control unit 23 causes the power unit 26 to stop supplying power to the VBAT (B) terminal and the V33 (B) terminal. In this way, the number of components of the camera system 1 can be reduced. Further, the body-side control unit 23 may cause the power unit 26 to stop supplying power to the VBAT (B) terminal and the V33 (B) terminal, upon detection of both the unlocking button being pressed and the signal level of the LDET (B) terminal changing from the low level to the high level. Alternatively, the body-side control unit 23 may cause the power unit 26 to stop supplying power to the VBAT (B) terminal and the V33 (B) terminal, upon detection of either one of the unlocking button being pressed or the signal level of the LDET (B) terminal changing from the low level to the high level.

As described above, during attachment and removal of the interchangeable lens to and from the camera body (the attachment incompletion state), the lens-side terminals are brought into contact with other body-side terminals than those intended to match upon completion of attachment. It is preferable that the arrangement of lens-side and body-side terminals should cause less trouble that may occur due to the contact during attachment and removal.

Terminal Arrangement with Noises Taken into Consideration

In the embodiment, among the plurality of body-side terminals, the LDET (B) terminal is positioned at the headmost end in the attachment direction (the arrow 44 in FIG. 5A) of the lens. In other words, the location of the LDET (B) terminal is the leftmost side of the body-side terminals in FIG. 5A as described above. Similarly, among the plurality of lens-side terminals, the LDET (L) terminal is positioned at the headmost end in the attachment direction (the arrow 44 in FIG. 6) of the lens. In other words, the location of the LDET (L) terminal is the rightmost side of the lens-side terminals in FIG. 6 as described above. Consequently, the LDET (B) terminal is not brought into contact with other lens-side terminals than the LDET (L) terminal until the attachment of the attachment lens is completed. As a result, the signal level of the LDET (B) terminal is not accidentally be brought to the low level in the process of attachment of the interchangeable lens, and thus an erroneous recognition of the lens attachment can be avoided.

In the embodiment, the VBAT (B) terminal is positioned next to the LDET (B) terminal, that is, at the second place from the headmost end in the attachment direction. The VBAT (L) terminal is positioned next to the LDET (L) terminal, that is, at the second place from the headmost end in the attachment direction. The purpose of such arrangement is to reduce the number of lens-side terminals that the VBAT (B) terminal on the camera body side contacts in the process of attachment of the lens. The drive-related power supply voltage applied to the VBAT (B) terminal is higher than the power supply voltage applied to any other terminals, and if the VBAT (B) terminal is brought into contact with any other terminal than the VBAT (L) terminal in such a situation that a high voltage is applied to the VBAT (B) terminal due to, for example, a failure of the camera system 1, the high voltage may place an unexpected load on electric circuits in the interchangeable lens. In the embodiment, the VBAT (B) terminal is located next to the LDET (B) terminal, only the LDET (L) terminal among the plurality of the lens-side terminals is brought into contact with the VBAT (B) terminal during attachment of the interchangeable lens 3. As illustrated in FIG. 2, the LDET (L) terminal is grounded through the resistor R3, and even if a high voltage is applied from the VBAT (B) terminal, the camera system 1 is not affected.

In the embodiment, the PGND (B) terminal which is a ground potential is positioned next to the VBAT (B) terminal, that is, at the third place from the headmost end in the attachment direction. The PGND (L) terminal is positioned next to the VBAT (L) terminal, that is, at the third place from the headmost end in the attachment direction. The capacitor C1 connected to the VBAT (L) terminal is supplied with and charged by a high voltage from the VBAT (B) terminal. While the interchangeable lens 3 is rotated in a removal direction, the VBAT (L) terminal is first brought into contact with the PGND (B) terminal. The charge stored on the capacitor C1 is rapidly discharged from the PGND (B) terminal, which is a ground potential, and other circuits in the camera system 1 are not affected.

In the embodiment, the V33 (B) terminal is positioned next to the PGND (B) terminal, that is, at the fourth place from the headmost end in the attachment direction, and the GND (B) terminal is positioned next to the V33 (B) terminal, that is, at the fifth place from the headmost end. The V33 (L) terminal is positioned next to the PGND (L) terminal, that is, at the fourth place from the headmost end in the attachment direction, and the GND (L) terminal is positioned next to the V33 (L) terminal, that is, at the fifth place from the headmost end. The capacitor C2 connected to the V33 (L) terminal is supplied with and charged by a voltage from the V33 (B) terminal. While the interchangeable lens 3 is rotated in the removal direction, the V33 (L) terminal is first brought into contact with the GND (B) terminal. The charge stored on the capacitor C2 is rapidly discharged from the GND (B) terminal, which is a ground potential, and other circuits in the camera system 1 are not affected.

The RDY (B) terminal is positioned next to the GND (B) terminal, that is, at the sixth place from the headmost end, the DATAB (B) terminal is positioned next to the RDY (B) terminal, that is, at the seventh place from the headmost end, the CLK (B) terminal is positioned next to the DATAB (B) terminal, that is, at the eighth place from the headmost end, the DATAL (B) terminal is positioned next to the CLK (B) terminal, that is, at the ninth place from the headmost end, the HCLK (B) terminal is positioned next to the DATAL (B) terminal, that is, at the tenth place from the headmost end, and the HDATA (B) terminal is positioned next to the HCLK (B) terminal, that is, at the last end.

The RDY (L) terminal is positioned next to the GND (L) terminal, that is, at the sixth place from the headmost end, the DATAB (L) terminal is positioned next to the RDY (L) terminal, that is, at the seventh place from the headmost end, the CLK (L) terminal is positioned next to the DATAB (L) terminal, that is, at the eighth place from the headmost end, the DATAL (L) terminal is positioned next to the CLK (L) terminal, that is, at the ninth place from the headmost end, the HCLK (L) terminal is positioned next to the DATAL (L) terminal, that is, at the tenth place from the headmost end, and the HDATA (L) terminal is positioned next to the HCLK (L) terminal, that is, at the last end.

Next, description will be made as to an effect of noise caused by communication lines formed between the body-side terminals and the lens-side terminals. In the hot-line communication, information (lens data) is transmitted to the body one-sidedly after the communication is started and the communication is performed highly frequently (repeated in a very short cycle). In the hot-line communication, a clock signal (H clock signal) is transmitted from the HCLK (L) terminal to the HCLK (B) terminal. The clock signal is a cyclic signal of high and low levels in a very short cycle, and thus may be a major cause of noise for other signals. Further, the clock signal transmitted from the HCLK (L) terminal to the HCLK (B) terminal is a signal output from the interchangeable lens 3, so that even if the clock signal is accidentally affected by a noise, the noise cannot be recognized on the side of the camera body 2. Accordingly, a clock signal (H clock signal) flowing through the HCLK terminals may be a cause of noise or noises may affect the clock signal (H clock signal), which may be a cause of a fault operation of the camera system 1. Examples of such a fault operation include erroneous detection of attachment of the interchangeable lens and misjudging whether or not the command communication is allowed.

In the embodiment, the HCLK terminal is positioned away from the VBAT terminal to which a high voltage is applied. Since voltage and current on the VBAT terminal for driving the driving unit 37 of the interchangeable lens 3 are prone to variation due to a driving state of the driving unit 37, such variation in voltage and current on the VBAT terminal may be a noise for other terminals. Accordingly, the VBAT terminal is positioned away from the HCLK terminal, so that effects of noises caused by the variation in voltage and current on the VBAT terminal on the clock signal (H clock signal) can be suppressed. It is possible to suppress noises affecting the clock signal (H clock signal).

The RDY terminal is a terminal used to indicate whether or not the command communication is allowed. The HCLK terminal, which may be a cause of noise, is positioned away from the RDY terminal such that the HCLK terminal is not adjacent to the RDY terminal. In this way, effects of noises due to the clock signal (H clock signal) on a signal on the RDY terminal can be suppressed.

The HDATA terminal and DATAL terminal are arranged on opposite both sides of the HCLK terminal. With this arrangement, effects of noises from the HCLK terminal on other terminals than the HDATA terminal and DATAL terminal can be suppressed. This is because signals flowing through the HDATA terminal and the DATAL terminal have less variation than the clock signal (H clock signal) and thus effects of variation in the clock signal (H clock signal) on other terminals than the HDATA terminal and the DATAL terminal can be suppressed.

Next, in the command data communication, information is transmitted and received bidirectionally between the body and the interchangeable lens, as described above. In the command data communication, a clock signal (C clock signal) is transmitted from the CLK (B) terminal to the CLK (L) terminal. The clock signal transmitted through the CLK terminals may also be a cause of noise for the same reason as described above. In addition, any clock signal (C clock signal) affected by a noise may cause an irregularity in the command communication. In the embodiment, therefore, the CLK terminal is positioned away from the VBAT terminal to which a high voltage is applied. Since voltage and current on the VBAT terminal for driving the driving unit 37 of the interchangeable lens 3 are prone to variation due to a driving state of the driving unit 37, such variation in voltage and current on the VBAT terminal may be a noise for other terminals. Accordingly, the VBAT terminal is positioned away from the CLK terminal, so that effects of noises from the VBAT terminal on the clock signal (C clock signal) can be suppressed. In other words, it is possible to suppress noises affecting the clock signal (C clock signal).

In addition, the CLK terminal is positioned away from the RDY terminal such that the HCLK terminal is not adjacent to the RDY terminal that is used to indicate whether or not the command communication is allowed.

Further, if the HCLK terminal and the CLK terminal are adjacent to each other, one clock signal may affect the other clock signal, providing a cause of noise. In the embodiment, the DATAL terminal is positioned between the CLK terminal and the HCLK terminal. In addition, the DATAB terminal is positioned between the CLK terminal and the RDY terminal. In other words, the DATAL terminal and DATAB terminal are arranged on opposite both sides of the CLK terminal. In this way, effects of noises originating from the CLK terminal on the camera system can be suppressed. This is because signals flowing through the DATAL terminal and the DATAB terminal have less variation than the clock signal (C clock signal) and thus effects of variation in the clock signal (C clock signal) on other terminals than the DATAL terminal and the DATAB terminal can be suppressed.

This is because, with the DATAL terminal positioned between the CLK terminal and the HCLK terminal, signals flowing through the DATAL terminal have less variation than the clock signal (C clock signal) from the CLK terminal and the clock signal (H clock signal) from the HCLK terminal, and thus either effects of variation in the clock signal (C clock signal) from the CLK terminal on the clock signal (H clock signal) from the HCLK terminal or effects of variation in the clock signal (H clock signal) from the HCLK terminal on the clock signal (C clock signal) from the CLK terminal can be suppressed.

As also described above, it is necessary to discriminate the level of the RDY terminal in order to perform the command data communication. This means that a noise has a major effect on imaging operation because the signal level of the RDY terminal is indicative of whether or not the command data can be communicated. Consider here the case where the body-side control unit 23 erroneously recognizes due to a noise that command data can be communicated despite the situation where the command data cannot be communicated. In this case, although the lens-side control unit 33 cannot receive command data, the body-side control unit 23 transits the command data and the body-side control unit 23 erroneously recognizes that control will be made on the interchangeable lens according to the command data. However, since the lens-side control unit 33 cannot accept the command data, the control according to such erroneously transmitted command data is no longer be made. As a result, the operation of the camera system 1 may be disrupted. Accordingly, it is necessary to prevent noises from affecting signals on the RDY terminal. To prevent noises from affecting signals on the RDY terminal, it is desirable that terminals through which relatively stable signals, that is, those signals that have less variation in the signal level per unit time flow are positioned on opposite both sides of the RDY terminal. In the embodiment, the GND terminal and DATAB terminal are arranged on opposite both sides of the RDY terminal. The GND terminal, which is at ground potential, is stable and the DATAB terminal is also a terminal through which more stable signals flow than the CLK terminal and the HCLK terminal. In this way, effects of noises affecting the RDY terminal can be suppressed.

Next, power (drive-related power supply voltage) supplied from the VBAT (B) terminal to the VBAT (L) terminal is used to drive the actuator (for example, stepper motor) of the driving unit 37 of the interchangeable lens 3. Accordingly, current flowing through the VBAT terminal largely vary between a period in which the actuator is driven and a period in which the actuator is not driven. Such variation in the current may be a cause of noise on signals flowing through other terminals. In the embodiment, the VBAT terminal is positioned away from the RDY terminal, the DATAB terminal, the CLK terminal, and the DATAL terminal, which are used for the command data communication, and the HCLK terminal and the HDATA terminal, which are used for the hot-line communication. Further, the GND terminal, the V33 terminal, and the PGND terminal are positioned between the VBAT terminal and terminal used for both modes of the communication. In particular, since the GND terminal and the PGND terminal of these terminals are terminals for a ground potential, effects of noises can be suppressed. In this way, effects of noises caused by the variation in current flowing through the VBAT terminal on the data communication can be suppressed.

The terminal arrangement with noises taken into consideration as described above will now be summarized.

The RDY terminal is positioned away from both the VBAT terminal and the HCLK terminal, which each may be a cause of noise, such that the RDY terminal is not adjacent to both the VBAT terminal and the HCLK terminal. In this way, effects of noises on the RDY terminal that is used to indicate whether or not the command communication is allowed can be suppressed.

The HCLK terminal that may be a cause of noise is positioned between the HDATA terminal and the DATAL terminal, and the CLK terminal is positioned between the DATAL terminal and the DATAB terminal. In other words, the HDATA terminal, the HCLK terminal, the DATAL terminal, the CLK terminal, and the DATAB terminal is arranged in order from the last end in the attachment direction. In this way, effects of noises caused by a clock signal into the RDY and the like terminals can be suppressed. Further, in consideration of effects of noises, terminals for power supply are positioned away from terminals used for communication across the RDY terminal. Specifically, with the RDY terminal in between, on the head end side from the RDY terminal, terminals for power supply: the VBAT terminal, the PGND terminal, the V33 terminal, and the GND terminal are arranged in order from the head end side, and on the last end side from the RDY terminal, terminals used for communication: the DATAB terminal, the CLK terminal, the DATAL terminal, the HCLK terminal, and the HDATA terminal are arranged in order from the head end side. In this way, effects of power supply-related terminals such as the VBAT terminal on any terminal used for communication can be suppressed. Effects of noises from the power supply-related terminals such as the VBAT terminal and the terminals used for communication such as the HCLK terminal and the CLK terminal on the RDY terminal can be suppressed.

As for the HCLK terminal through which a clock signal (H clock signal) used for the hot-line communication and the CLK terminal through which a clock signal (C clock signal) used for the command data communication, the HCLK terminal is positioned farther away from the VBAT terminal than the CLK terminal. The reason is as follows. The clock signal (C clock signal) transmitted to the interchangeable lens 3 through the CLK terminal is output by the body-side control unit 23 through the body-side communication unit 24. However, any noise affecting the clock signal (H clock signal) transmitted to the camera body through the HCLK (L) terminal from the interchangeable lens via the lens-side communication unit 34 may be a cause of erroneous recognition by the body-side control unit 23. Therefore, a noise affecting the clock signal (H clock signal) on the HCLK terminal has a greater effect on the camera system 1.

As for the HCLK terminal and the GND terminal, the HCLK terminal is positioned farther away from the VBAT terminal than the GND terminal. In addition, the PGND terminal is positioned between the GND terminal and the VBAT terminal. In this way, the HCLK terminal through which the clock signal (H clock signal) used for the hot-line communication is transmitted can be shielded from any noise originating from the VBAT terminal.

As for the CLK terminal and the GND terminal, the CLK terminal is positioned farther away from the VBAT terminal than the GND terminal. In addition, the PGND terminal is positioned between the GND terminal and the VBAT terminal. In this way, the CLK terminal through which the clock signal (C clock signal) used for the command data communication is transmitted can be shielded from any noise originating from the VBAT terminal.

Terminal Arrangement with Wear Taken into Consideration

Description will now be made as to contacts between terminals during attachment and removal of the interchangeable lens 3 to and from the camera body 2.

During attachment of the interchangeable lens 3 to the camera body 2, the body-side terminals are brought into contact with the lens-side terminals in succession. The same applies to during removal of the interchangeable lens 3 from the camera body 2. In other words, the body-side terminals, which are pins protruding from the body-side terminal holding unit 22, are rubbed against the lens-side terminals, which are exposed conductive contact surfaces, in succession. Since more than one interchangeable lens may be attached and removed to and from one camera body, the body-side terminals are more prone to wear than the lens-side terminals. In particular, the body-side terminals located nearer to the last end in the attachment direction of the interchangeable lens 3 are rubbed against more lens-side terminals and more subjected to wear. Consequently, the body-side terminals located nearer to the last end are more subjected to wear on pin tips than the body-side terminals located nearer to the head end. Wear on the body-side terminals may have an effect on contactability with the lens-side terminals, and thus may cause unstable data communication.

In the embodiment, the LDET (B) terminal is positioned at the headmost end in the attachment direction, and thus the LDET (B) terminal may be subjected to the least wear. In this way, the LDET (B) terminal and the LDET (L) terminal make a good contact with each other, resulting in less possibility of erroneous detection of attachment or removal of the interchangeable lens 3.

As described above, in the embodiment, the CLK (B) terminal and the HCLK (B) terminal are positioned away from the VBAT (B) terminal in order to suppress effects of noises on communication. In other words, the VBAT (B) terminal is positioned at the second place from the head end in the attachment direction, and the CLK (B) terminal and the HCLK (B) terminal are positioned in the last end side away from the VBAT (B) terminal. Accordingly, the CLK (B) terminal and the HCLK (B) terminal are more subjected to wear than the LDET (B) terminal and the VBAT (B) terminal. In the embodiment, the CLK (B) terminal and the HCLK (B) terminal are positioned immediately close to the first body-side claw 29*a*. Specifically, the CLK (B) terminal and the HCLK (B) terminal are positioned nearer to the inner circumferential edge, which is an edge on the inner circumferential side, of the first body-side claw 29*a* than the VBAT (B) terminal. In other words, the distance between the CLK (B) terminal and the inner circumferential edge of the first body-side claw 29*a* is shorter than the distance between the VBAT (B) terminal and the inner circumferential edge of the first body-side claw 29*a*, and the distance between the HCLK (B) terminal and the inner circumferential edge of the first body-side claw 29*a* is shorter than the distance between the VBAT (B) terminal and the inner circumferential edge of the first body-side claw 29*a*. As described above, the first flat spring 41a is provided behind the first body-side claw 29a, and the first lens-side claw 39a is pressed in the +Z direction (FIG. 1) by the first flat spring 41a. From the first flat spring 41a viewpoint, both the distance between the CLK (B) terminal and the first flat spring 41a and the distance between the HCLK (B) terminal and the first flat spring 41a are shorter than the distance between the VBAT (B) terminal and the first flat spring 41a. The LDET (B) terminal is similar to the VBAT (B) terminal; both the distance between the CLK (B) terminal and the first flat spring 41a and the distance between the HCLK (B) terminal and the first flat spring 41a are shorter than the distance between the LDET (B) terminal and the first flat spring 41a. In this way, the CLK (B) terminal and the HCLK (B) terminal are pressed against the lens-side terminals more forcefully than the VBAT (B) terminal and the LDET (B) terminal.

On the lens side, the CLK (L) terminal and the HCLK (L) terminal are positioned nearer to the inner circumferential edge of the first lens-side claw 39a than the VBAT (L) terminal. In other words, the distance between the CLK (L) terminal and the inner circumferential edge of the first lens-side claw 39a is shorter than the distance between the VBAT (L) terminal and the inner circumferential edge of the first lens-side claw 39a, and the distance between the HCLK (L) terminal and the inner circumferential edge of the first lens-side claw 39a is shorter than the distance between the VBAT (L) terminal and the inner circumferential edge of the first lens-side claw 39a. Accordingly, in the attachment completion state, the CLK (L) and HCLK (L) terminals located close to the first lens-side claw 39a are pressed against their corresponding body-side terminals by the first flat spring 41a. The LDET (L) terminal is similar to the VBAT (L) terminal; in the attachment completion state, both the distance between the CLK (L) terminal and the first flat spring 41a and the distance between the HCLK (L) terminal and the first flat spring 41a are shorter than the distance between the LDET (L) terminal and the first flat spring 41a. In this way, in the attachment completion state, a stronger pressing force against the body-side terminals acts on the CLK (L) and HCLK (L) terminals than the LDET (L) terminal. In this way, even if the CLK (B) terminal or the HCLK (B) terminal is subjected to wear, good contact can be maintained, resulting in their stable clock signal and stable data communication. In addition, for example, even in case of impact on the camera body 2 or the interchangeable lens 3 while the attachment completion state is maintained, contact between the CLK (B) terminal and the CLK (L) terminal and contact between the HCLK (B) terminal and the HCLK (L) terminal can be maintained.

Even in the case where the first lens-side claw 39a has a partial cutout, a combination of a protruding portion and a cut-out portion located in an area where they face the first body-side claw 29a shall serve as the first lens-side claw. As for how the cutout is made, the lens-side claw may be circumferentially separated into 2 or more parts; a part of the lens-side claw may be cut out; or at least a part of the lens-side claw may be cut out such that a radial length is shortened. A circumferential length of the lens-side claw may be altered to the extent that it passes through the corresponding body-side insertion-extraction section. The same applies to the second lens-side claw 39b, the third lens-side claw 39c, and fourth lens-side claw 39d. A radial thickness of the cylindrical section may be altered as necessary and the shape may have at least a partial inward protrusion as compared to the cylindrical section of the embodiment.

As described above, the CLK (B) terminal and the HCLK (B) terminal are more subjected to wear than the LDET (B) terminal and the VBAT (B) terminal. In the embodiment, the CLK (B) terminal and the HCLK (B) terminal are positioned immediately close to the first body-side claw 29a. Specifically, the CLK (B) terminal and the HCLK (B) terminal are positioned nearer to the inner circumferential edge of the first body-side claw 29a than the LDET (B) terminal and the VBAT (B) terminal. In other words, the distance between the CLK (B) terminal and the inner circumferential edge of the first body-side claw 29a is shorter than the distance between each of the LDET (B) and VBAT (B) terminals and the inner circumferential edge of the first body-side claw 29a, and the distance between the HCLK (B) terminal and the inner circumferential edge of the first body-side claw 29a is shorter than the distance between each of the LDET (B) and VBAT (B) terminals and the inner circumferential edge of the first body-side claw 29a. As described above, the first flat spring 41a is provided behind the first body-side claw 29a, and the first lens-side claw 39a is pressed in the +Z direction (FIG. 1) by the first flat spring 41a. From the first flat spring 41a viewpoint, both the distance between the CLK (B) terminal and the first flat spring 41a and the distance between the HCLK (B) terminal and the first flat spring 41a are shorter than the distance between each of the LDET (B) and VBAT (B) terminals and the first flat spring 41a.

On the lens side, the CLK (L) terminal and the HCLK (L) terminal are positioned nearer to the inner circumferential edge of the first lens-side claw 39a than the LDET (L) terminal and the VBAT (L) terminal. In other words, the distance between the CLK (L) terminal and the inner circumferential edge of the first lens-side claw 39a is shorter than each of the distance between the LDET (L) and VBAT (L) terminals and the inner circumferential edge of the first lens-side claw 39a, and the distance between the HCLK (L) terminal and the inner circumferential edge of the first lens-side claw 39a is shorter than each of the distance between the LDET (L) and VBAT (L) terminals and the inner circumferential edge of the first lens-side claw 39a. Accordingly, the CLK (L) and HCLK (L) terminals located close to the first lens-side claw 39a are pressed against their corresponding body-side terminals by the first flat spring 41a. In this way, the CLK (B) terminal and the HCLK (B) terminal are pressed against the lens-side terminals more forcefully than the LDET (B) terminal and the VBAT (B) terminal. In this way, even if the CLK (B) terminal or the HCLK (B) terminal is subjected to wear, good contact can be maintained, resulting in stable data communication. In addition, for example, even in case of impact on the camera body 2 or the interchangeable lens 3 while the attachment completion state is maintained, contact between the CLK (B) and HCLK (B) terminals and the lens-side terminals can be maintained.

In the embodiment, the CLK (B) terminal and the HCLK (B) terminal are also near the fourth body-side claw 29d. Specifically, the CLK (B) terminal and the HCLK (B) terminal are positioned nearer to the fourth body-side claw 29d than the VBAT (B) terminal and the LDET (B) terminal. In other words, the distance between the CLK (B) terminal and the fourth body-side claw 29d is shorter than the distance between the VBAT (B) terminal or the LDET (B) terminal and the fourth body-side claw 29d, and the distance between the HCLK (B) terminal and the fourth body-side claw 29d is shorter than the distance between the VBAT (B) terminal or the LDET (B) terminal and the fourth body-side claw 29d. As described above, the fourth flat spring 41d is provided behind the fourth body-side claw 29d, and the fourth lens-side claw 39*d* is pressed in the +Z direction (FIG. 1) by the fourth flat spring 41*d*. Accordingly, the CLK (B) and HCLK (B) terminals located near the fourth lens-side claw 39*d* are pressed against the lens-side terminals stronger and in a more stable manner than the VBAT (B) terminal and the LDET (B) terminal by the first flat spring 41*a* and fourth flat spring 41*d*.

The distance between the CLK (B) terminal and the first body-side claw 29*a* (the same applies to the fourth lens-side claw 39*d* that is omitted in the following description) as described above refers to a distance in a straight line between one end of the first body-side claw 29*a* and the CLK (B) terminal, and may be defined as a distance in a straight line between the other end of the first body-side claw 29*a* and the CLK (B) terminal. Alternatively, the distance between the CLK (B) terminal and the first body-side claw 29*a* as described above may be defined as a distance in a straight line between a middle position of the first body-side claw 29*a* in the circumferential direction of the body-side mount 21 and the CLK (B) terminal. The distance between other body-side terminals such as the HCLK (B) terminal, the VBAT (B) terminal, and the LDET (B) terminal and the first body-side claw 29*a* is also a distance in a straight line. The distance between the first flat spring 41*a* (fourth flat spring 41*d*) and each of body-side terminals is also a distance in a straight line.

The distance between the CLK (B) terminal and the first body-side claw 29*a* (the same applies to the fourth body-side claw 29*d* that is omitted in the following description) as described above may be defined as a distance of arc between one end of the first body-side claw 29*a* in the circumferential direction of the body-side mount 21 and the CLK (B) terminal, or may be defined as a distance of arc between the other end of the first body-side claw 29*a* and the CLK (B) terminal. Alternatively, the distance between the CLK (B) terminal and the first body-side claw 29*a* as described above may be defined as a distance of arc between a middle position of the first body-side claw 29*a* in the circumferential direction of the body-side mount 21 and the CLK (B) terminal. The distance between other body-side terminals such as the HCLK (B) terminal, the VBAT (B) terminal, and the LDET (B) terminal and the first body-side claw 29*a* is also a distance of arc. The distance between the first flat spring 41*a* (fourth flat spring 41*d*) and body-side terminals is also a distance of arc.

Although description has been made as to the camera body 2, the same applies to the interchangeable lens 3. In the embodiment, the CLK (L) terminal and the HCLK (L) terminal are positioned immediately close to the first lens-side claw 39*a*. Specifically, the CLK (L) terminal and the HCLK (L) terminal are positioned nearer to the first lens-side claw 39*a* than the VBAT (L) terminal and the LDET (L) terminal. In other words, the distance between the CLK (L) terminal and the first lens-side claw 39*a* is shorter than the distance between the VBAT (L) terminal or the LDET (L) terminal and the first lens-side claw 39*a*, and the distance between the HCLK (L) terminal and the first lens-side claw 39*a* is shorter than the distance between the VBAT (L) terminal or the LDET (L) terminal and the first lens-side claw 39*a*. The first lens-side claw 39*a* is pressed in the +Z direction (FIG. 1) by the first flat spring 41*a* on the body side. Accordingly, similarly to those described above, the CLK (L) and HCLK (L) terminals located near the first lens-side claw 39*a* are pressed against the body-side terminals more forcefully than the VBAT (L) terminal or the LDET (L) terminal by the first flat spring 41*a*.

In the embodiment, as illustrated in FIG. 5A, the CLK (B) terminal and the HCLK (B) terminal are arranged inside a sector (in the range of an angle indicated by 50) formed by the center of the opening in the mount 21 (i.e. at the optical axis O of the interchangeable lens 3) and the arcuate first body-side claw 29*a*. Alternatively, the CLK (B) terminal and the HCLK (B) terminal are arranged inside a triangular area formed by the center of the opening in the mount 21 (i.e. at the optical axis O of the interchangeable lens 3) and the opposite ends of the first body-side claw 29*a* on the inner circumferential side. Accordingly, the first body-side claw 29*a* is not present on an extension of a long dashed short-dashed line 51 connecting the center of the opening in the mount 21 with the LDET (B) terminal, but the first body-side claw 29*a* is present on an extension of a long dashed short-dashed line 52 connecting the center of the opening in the mount 21 with the HCLK (B) terminal, and the first body-side claw 29*a* is present on an extension of a long dashed short-dashed line 53 connecting the center of the opening in the mount 21 with the CLK (B) terminal. In this way, in the attachment completion state, the CLK (B) terminal and the HCLK (B) terminal are pressed against the corresponding lens-side terminals more forcefully than the LDET (B) terminal.

As illustrated in FIG. 6, the CLK (L) terminal and the HCLK (L) terminal are arranged inside a sector (in the range of an angle indicated by 60) formed by the center of the opening in the mount 31 (i.e. at the optical axis O of the interchangeable lens 3) and the arcuate first lens-side claw 39*a*. Alternatively, the CLK (L) terminal and the HCLK (L) terminal are arranged inside a triangular area formed by the center of the opening in the mount 31 (i.e. at the optical axis O of the interchangeable lens 3) and the opposite ends of the first lens-side claw 39*a* on the outer circumferential side. Accordingly, the first lens-side claw 39*a* is not present on an extension of a long dashed short-dashed line 61 connecting the center of the opening in the mount 31 with the LDET (L) terminal, but the first lens-side claw 39*a* is present on an extension of a long dashed short-dashed line 62 connecting the center of the opening in the mount 31 with the HCLK (L) terminal, and the first lens-side claw 39*a* is present on an extension of a long dashed short-dashed line 63 connecting the center of the opening in the mount 31 with the CLK (L) terminal. In this way, in the attachment completion state, the CLK (L) terminal and the HCLK (L) terminal are in contact with the corresponding body-side terminals more stably than the LDET (L) terminal. In other words, a stronger pressing force against the body-side terminals acts on the CLK (L) terminal and the HCLK (L) terminal than the LDET (L) terminal. As a result, even if the tip of the CLK (B) terminal or the HCLK (B) terminal is subjected to wear, the clock signal can stably be communicated between the camera body 2 and the interchangeable lens 3.

In the embodiment, although description has been made as to the CLK (B) terminal, the CLK (L) terminal, the HCLK (B) terminal, and the HCLK (L) terminal, the same applies to other communication-related terminals such as the HDATA (B) terminal, the HDATA (L) terminal, the DATAL (B) terminal, the DATAL (L) terminal, the DATAB (B) terminal, and the DATAB (L) terminal. In other words, the HDATA (B) terminal, the DATAL (B) terminal, and the DATAB (B) terminal are positioned closer to the first body-side claw 29*a* and the first flat spring 41*a* than the LDET (B) terminal and the VBAT (B) terminal (the distance is shorter). In this way, the HDATA (B) terminal, the DATAL (B) terminal, and the DATAB (B) terminal are pressed against the lens-side terminals more forcefully than the VBAT (B) terminal and the LDET (B) terminal, so that good contact can be maintained with the lens-side terminals. Further, the HDATA (L) terminal, the DATAL (L) terminal, and the DATAB (L) terminal are positioned closer to the first lens-side claw 39a than the LDET (L) terminal and the VBAT (L) terminal (the distance is shorter). In this way, the HDATA (L) terminal, the DATAL (L) terminal, and the DATAB (L) terminal are pressed against the body-side terminals more forcefully than the VBAT (L) terminal and the LDET (L) terminal, so that good contact can be maintained with the body-side terminals.

Second Embodiment

Figure 7:
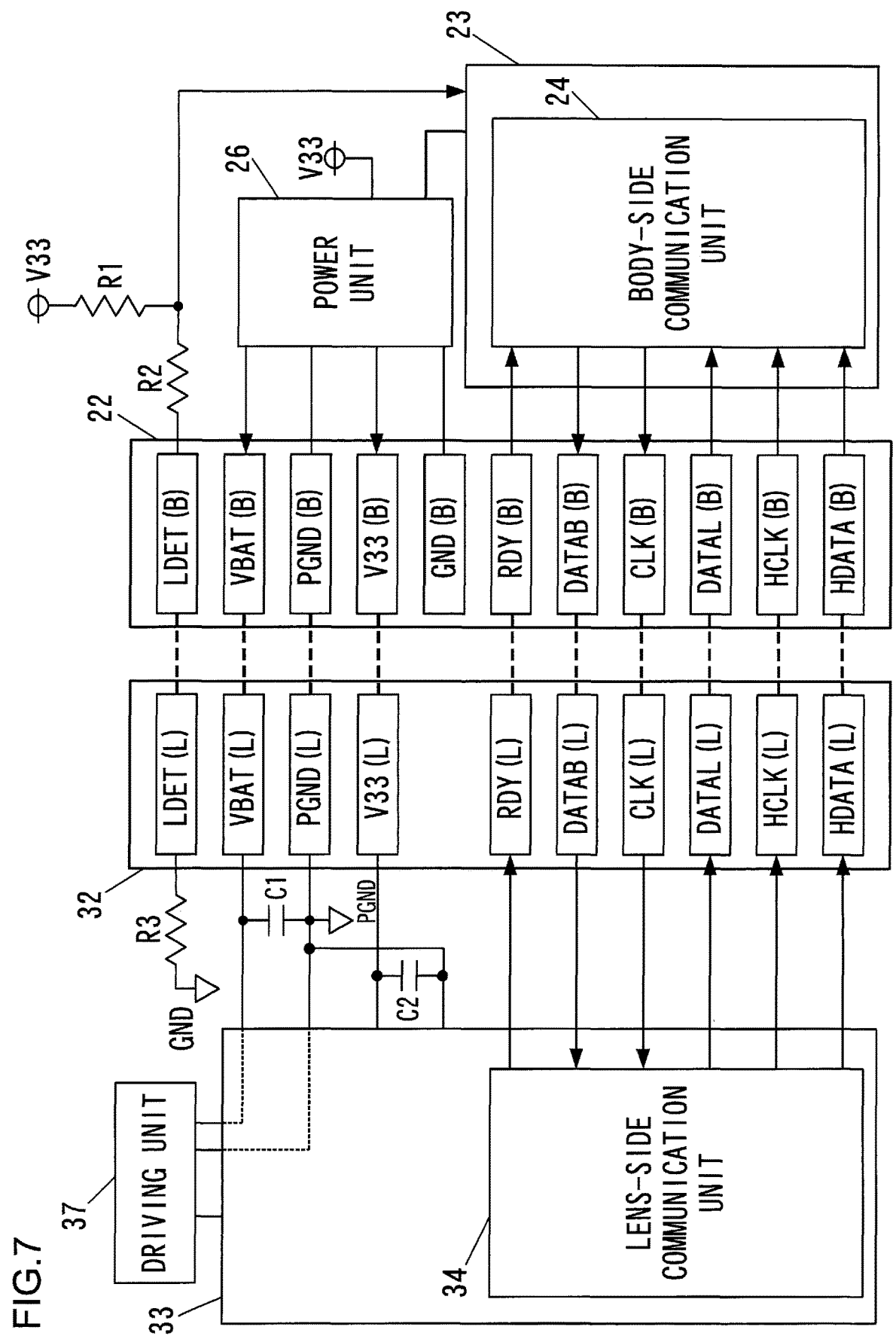
FIG. 7 is a circuit diagram schematically illustrating electrical connections between a camera body and an interchangeable lens according to a second embodiment.

Next, an interchangeable lens 3 of a camera system 1 according to a second embodiment will be described. Description of configurations common to the first embodiment described above is omitted. FIG. 7 is a circuit diagram schematically illustrating electrical connections between a camera body 2 and the interchangeable lens 3 according to the second embodiment. As illustrated in FIG. 7, a lens-side terminal holding unit 32 in the interchangeable lens 3 according to the second embodiment includes, like the interchangeable lens 3 according to the first embodiment, an LDET (L) terminal, a VBAT (L) terminal, a PGND (L) terminal, a V33 (L) terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the second embodiment does not include the GND (L) terminal in the interchangeable lens 3 according to the first embodiment.

To cope with this, in the interchangeable lens 3 according to the second embodiment, the PGND (L) terminal is used as a ground potential (ground) for the power supply voltage for the driving system and is connected to the lens-side control unit 33 and the like units to be used as a ground potential (ground) for the power supply voltage for the circuitry. Between the V33 (L) terminal and the PGND (L) terminal, a bypass capacitor C2 is connected.

The connections and configurations of terminals other than the PGND (L) terminal of the interchangeable lens 3 according to the second embodiment are similar to the interchangeable lens 3 according to the first embodiment. As with the example illustrated in FIG. 6, terminals of LDET (L), VBAT (L), PGND (L), V33 (L), RDY (L), DATAB (L), CLK (L), DATAL (L), HCLK (L), and HDATA (L) are arranged at the lens-side terminal holding unit 32.

Third Embodiment

Figure 8:
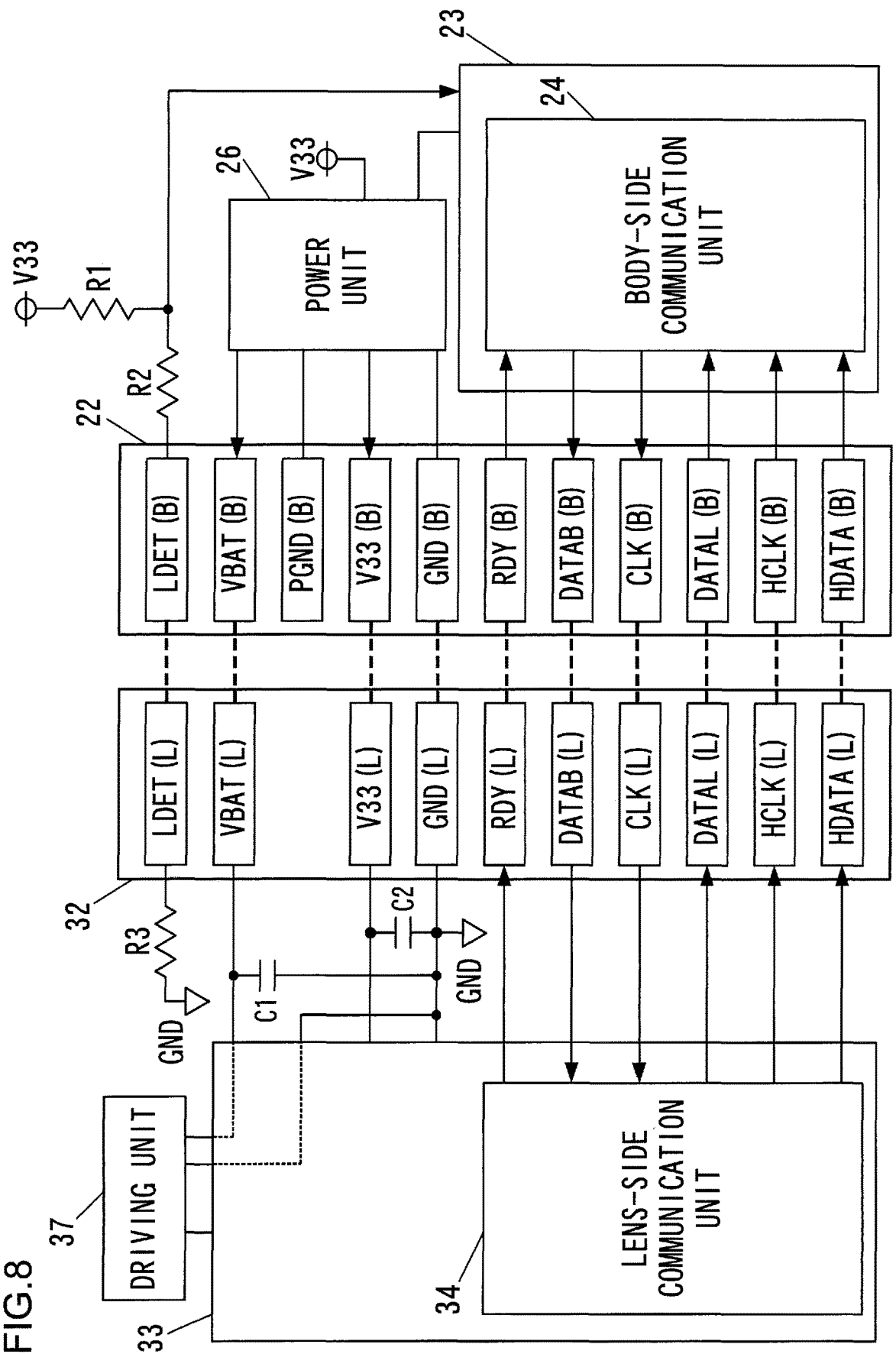
FIG. 8 is a circuit diagram schematically illustrating electrical connections between a camera body and an interchangeable lens according to a third embodiment.

Next, an interchangeable lens 3 of the camera system 1 according to a third embodiment will be described. Description of configurations common to the first embodiment is omitted. FIG. 8 is a circuit diagram schematically illustrating electrical connections between a camera body 2 and the interchangeable lens 3 according to the third embodiment. As illustrated in FIG. 8, a lens-side terminal holding unit 32 in the interchangeable lens 3 according to the third embodiment includes, like the interchangeable lens 3 according to the first embodiment, an LDET (L) terminal, a VBAT (L) terminal, a V33 (L) terminal, a GND (L) terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the third embodiment does not include the PGND (L) terminal in the interchangeable lens 3 according to the first embodiment.

To cope with this, in the interchangeable lens 3 according to the third embodiment, the GND (L) terminal is used as a ground potential (ground) for the power supply voltage for the circuitry and is connected to the driving unit 37 and the like units to be used also as a ground potential (ground) for the power supply voltage for the driving system. Between the VBAT (L) terminal and the GND (L) terminal, a bypass capacitor C1 is connected and between the V33 (L) terminal and the GND (L) terminal, a bypass capacitor C2 is connected.

The connections and configurations of terminals other than the GND (L) terminal of the interchangeable lens 3 according to the third embodiment are similar to the interchangeable lens 3 according to the first embodiment. As with the example illustrated in FIG. 6, the terminals of LDET (L), VBAT (L), V33 (L), GND (L), RDY (L), DATAB (L), CLK (L), DATAL (L), HCLK (L), and HDATA (L) are arranged at the lens-side terminal holding unit 32.

Fourth Embodiment

Figure 9:
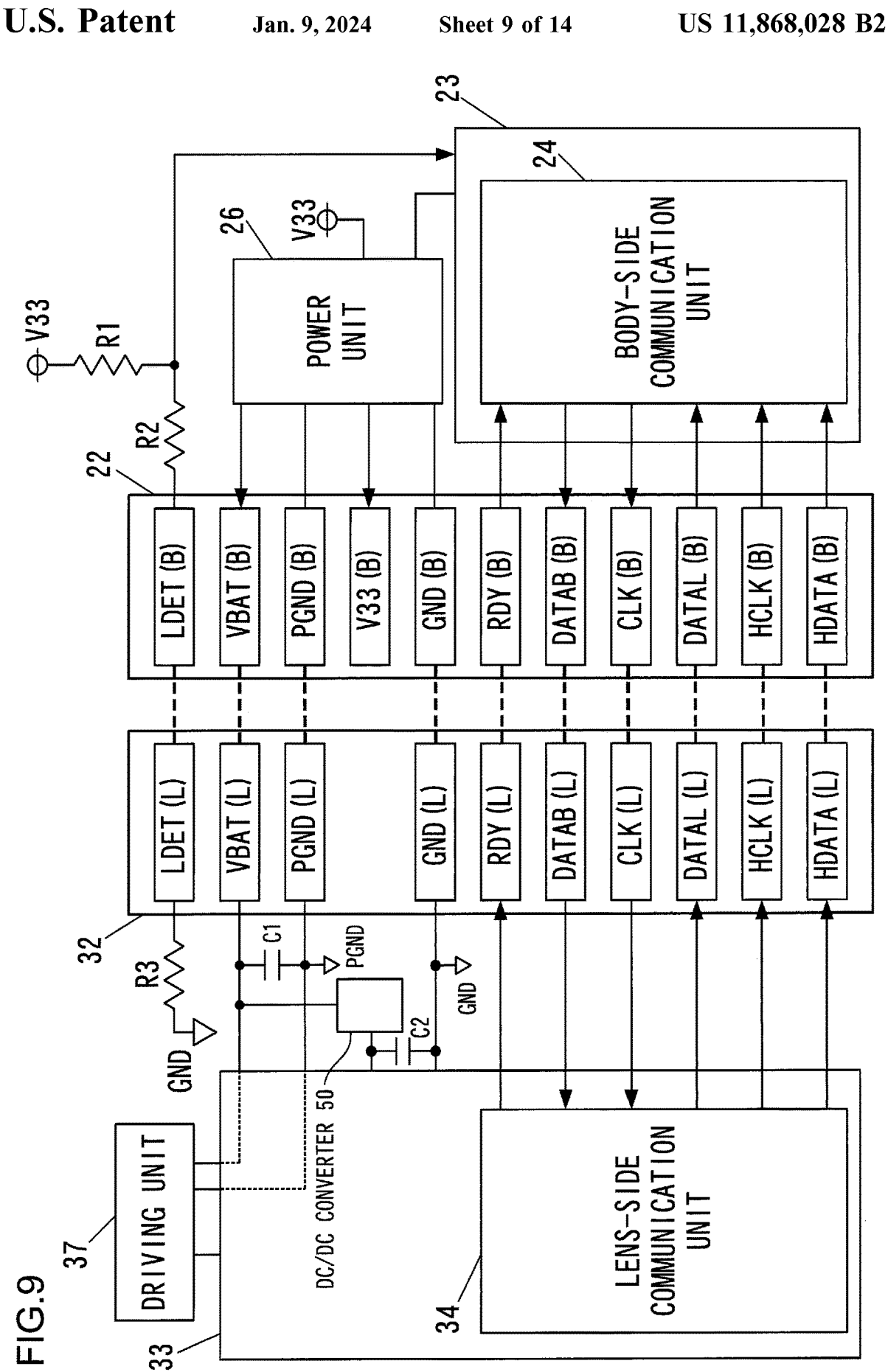
FIG. 9 is a circuit diagram schematically illustrating electrical connections between a camera body and an interchangeable lens according to a fourth embodiment.

Next, an interchangeable lens 3 of the camera system 1 according to a fourth embodiment will be described. Description of configurations common to the first embodiment is omitted. FIG. 9 is a circuit diagram schematically illustrating electrical connections between a camera body 2 and the interchangeable lens 3 according to the fourth embodiment. As illustrated in FIG. 9, a lens-side terminal holding unit 32 in the interchangeable lens 3 according to the fourth embodiment includes, like the interchangeable lens 3 according to the first embodiment, an LDET (L) terminal, a VBAT (L) terminal, a PGND (L) terminal, a GND (L) terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the fourth embodiment does not include the V33 (L) terminal in the interchangeable lens 3 according to the first embodiment, so that no power to be supplied to the lens-side control unit 33 and the like is supplied from the camera body 2.

To cope with this, the interchangeable lens 3 according to the fourth embodiment includes a DC/DC converter 50. The DC/DC converter 50, which is a step-down type voltage conversion circuit, for example, is connected to the VBAT (L) terminal and the lens-side control unit 33. The DC/DC converter 50 converts a voltage of power supply voltage supplied from the camera body 2 via the VBAT (L) terminal and supplies power to the lens-side control unit 33 and the like. Between a wire for supplying power from the DC/DC converter 50 to the lens-side control unit 33 and the like and the GND (L) terminal, a bypass capacitor C2 is connected.

The connections and configurations of terminals other than the VBAT (L) terminal of the interchangeable lens 3 according to the fourth embodiment are similar to the interchangeable lens 3 according to the first embodiment. As with the example illustrated in FIG. 6, terminals of LDET (L), VBAT (L), PGND (L), GND (L), RDY (L), DATAB (L), CLK (L), DATAL (L), HCLK (L), and HDATA (L) are arranged at the lens-side terminal holding unit 32.

Fifth Embodiment

Figure 10:
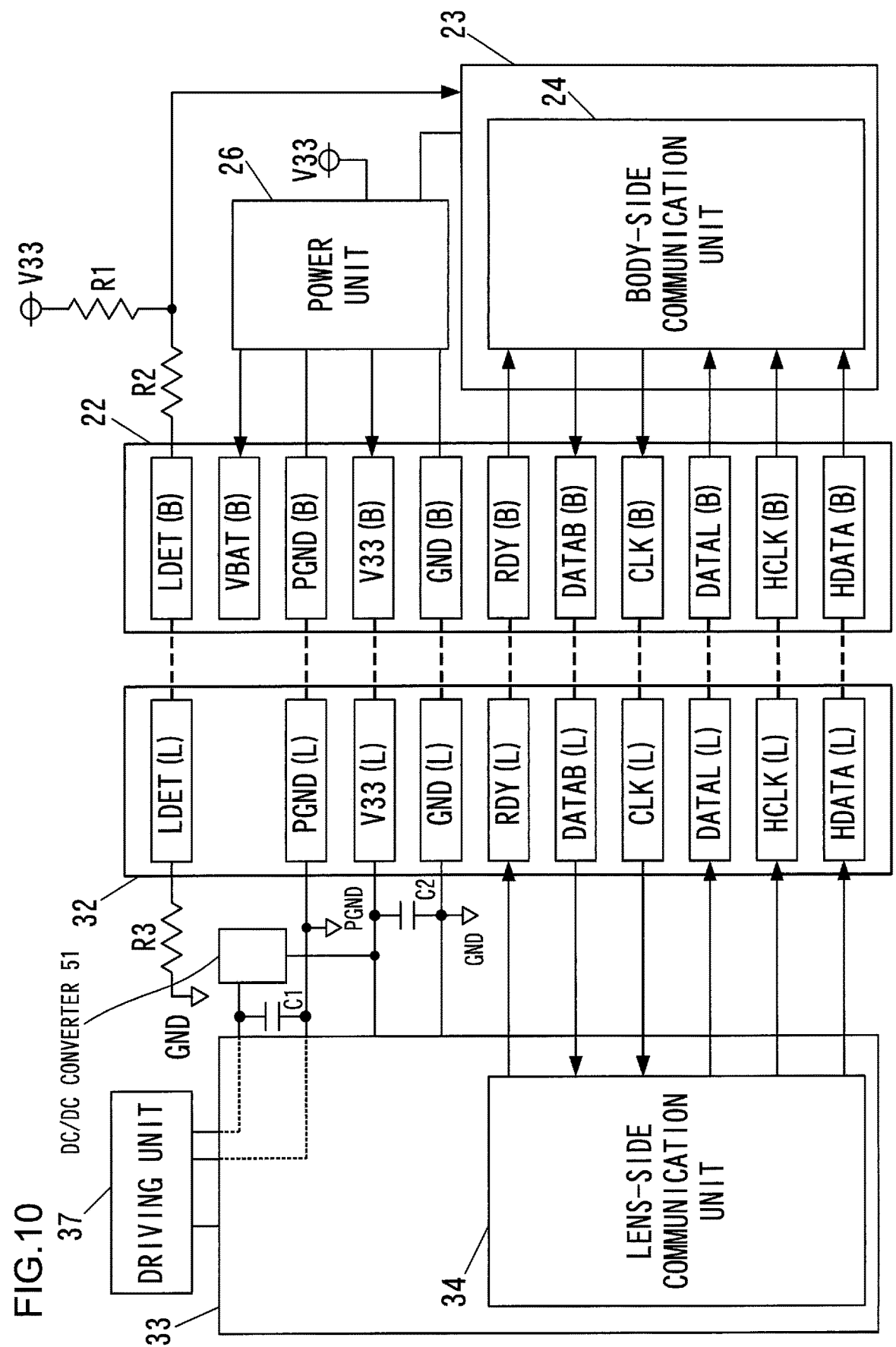
FIG. 10 is a circuit diagram schematically illustrating electrical connections between a camera body and an interchangeable lens according to a fifth embodiment.

Next, an interchangeable lens 3 of a camera system 1 according to a fifth embodiment will be described. Description of configurations common to the first embodiment described above is omitted. FIG. 10 is a circuit diagram schematically illustrating electrical connections between a camera body 2 and the interchangeable lens 3 according to the fifth embodiment. As illustrated in FIG. 10, a lens-side terminal holding unit 32 in the interchangeable lens 3 according to the fifth embodiment includes, like the interchangeable lens 3 according to the first embodiment, an LDET (L) terminal, a PGND (L) terminal, a V33 (L) terminal, a GND (L) terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the fifth embodiment does not include the VBAT (L) terminal, in the interchangeable lens 3 according to the first embodiment, so that no power for the driving system to be supplied to the driving unit 37 and the like is supplied from the camera body 2.

To cope with this, the interchangeable lens 3 according to the fifth embodiment includes a DC/DC converter 51. The DC/DC converter 51, which is a step-up voltage converter, for example, is connected to the V33 (L) terminal and the driving unit 37. The DC/DC converter 51 converts a voltage of power supply voltage supplied from the camera body 2 via the V33 (L) terminal and supplies power to the driving unit 37 and the like circuits for the driving system. Between a wire for supplying power from the DC/DC converter 51 to the driving unit 37 and the like and the PGND (L) terminal, a bypass capacitor C1 is connected.

The connections and configurations of terminals other than the V33 (L) terminal of the interchangeable lens 3 according to the fifth embodiment are similar to the interchangeable lens 3 according to the first embodiment. As with the example illustrated in FIG. 6, terminals of LDET (L), PGND (L), V33 (L), GND (L), RDY (L), DATAB (L), CLK (L), DATAL (L), HCLK (L), and HDATA (L) are arranged at the lens-side terminal holding unit 32.

Sixth Embodiment

Figure 11:
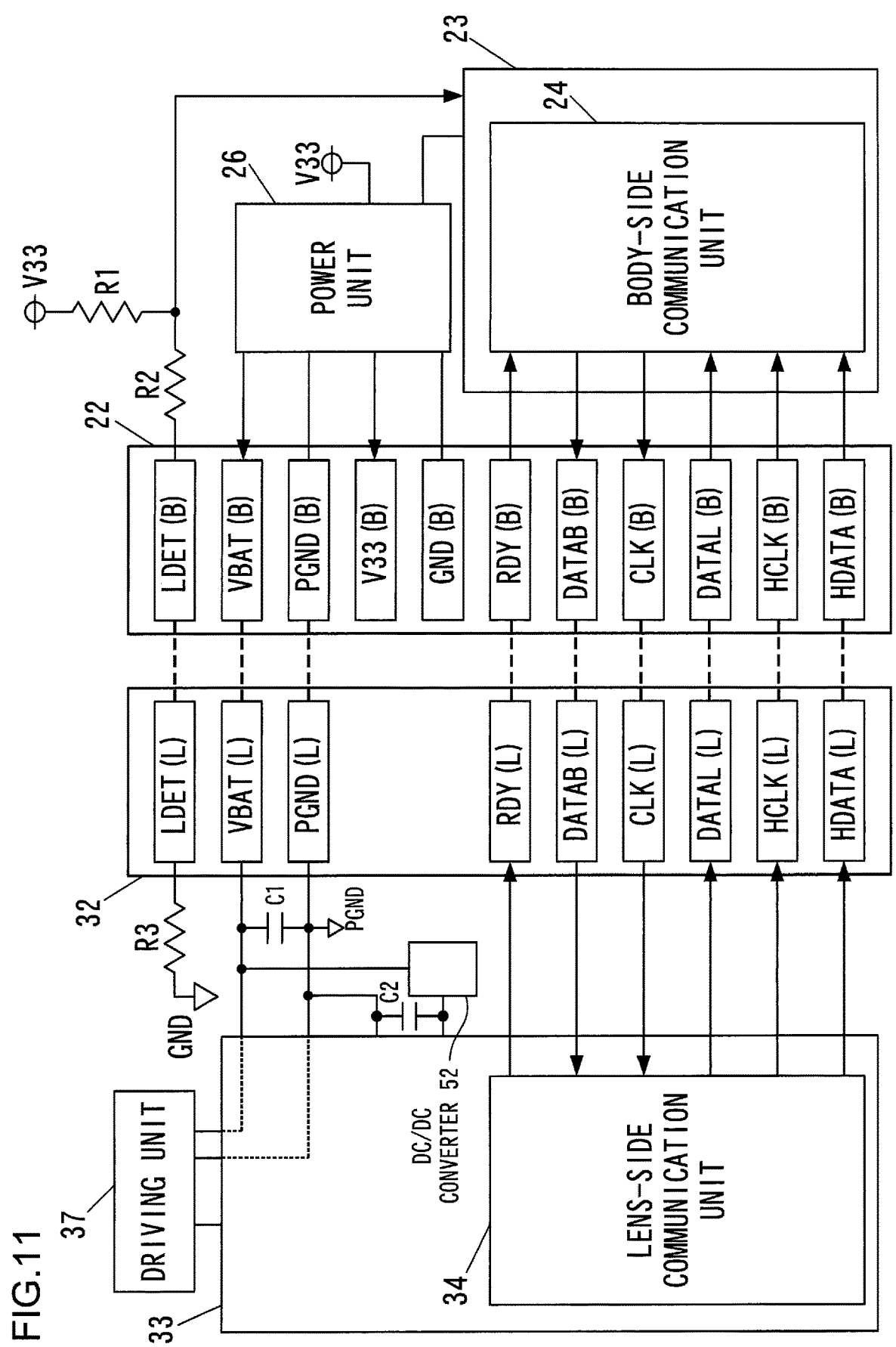
FIG. 11 is a circuit diagram schematically illustrating electrical connections between a camera body and an interchangeable lens according to a sixth embodiment.

Next, an interchangeable lens 3 of the camera system 1 according to a sixth embodiment will be described. Description of configurations common to the first embodiment is omitted. FIG. 11 is a circuit diagram schematically illustrating electrical connections between a camera body 2 and the interchangeable lens 3 according to the sixth embodiment. As illustrated in FIG. 11, a lens-side terminal holding unit 32 in the interchangeable lens 3 according to the sixth embodiment includes, like the interchangeable lens 3 according to the first embodiment, an LDET (L) terminal, a VBAT (L) terminal, a PGND (L) terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the sixth embodiment does not include the V33 (L) terminal and the GND (L) terminal in the interchangeable lens 3 according to the first embodiment, so that no power to be supplied to the lens-side control unit 33 and the like is supplied from the camera body 2.

To cope with this, the interchangeable lens 3 according to the sixth embodiment includes a DC/DC converter 52. The DC/DC converter 50, which is a step-down voltage converter, for example, is connected to the VBAT (L) terminal and the lens-side control unit 33. The DC/DC converter 52 converts a voltage of power supply voltage supplied from the camera body 2 via the VBAT (L) terminal and supplies power to the lens-side control unit 33 and the like.

In addition, in the interchangeable lens 3 according to the sixth embodiment, the PGND (L) terminal is used as a ground potential (ground) for power supply voltage for the driving system. Also, the PGND (L) terminal is connected to the lens-side control unit 33 and the like units and is used as a ground potential (ground) for power supply voltage for the circuitry. Between a wire for supplying power to the lens-side control unit 33 and the like from the DC/DC converter 52 and the PGND (L) terminal, a bypass capacitor C2 is connected.

The connections and configurations of terminals other than the VBAT (L) terminal and the PGND (L) terminal of the interchangeable lens 3 according to the sixth embodiment are similar to the interchangeable lens 3 according to the first embodiment. As with the example illustrated in FIG. 6, terminals of LDET (L), VBAT (L), PGND (L), RDY (L), DATAB (L), CLK (L), DATAL (L), HCLK (L), and HDATA (L) are arranged at the lens-side terminal holding unit 32.

Seventh Embodiment

Figure 12:
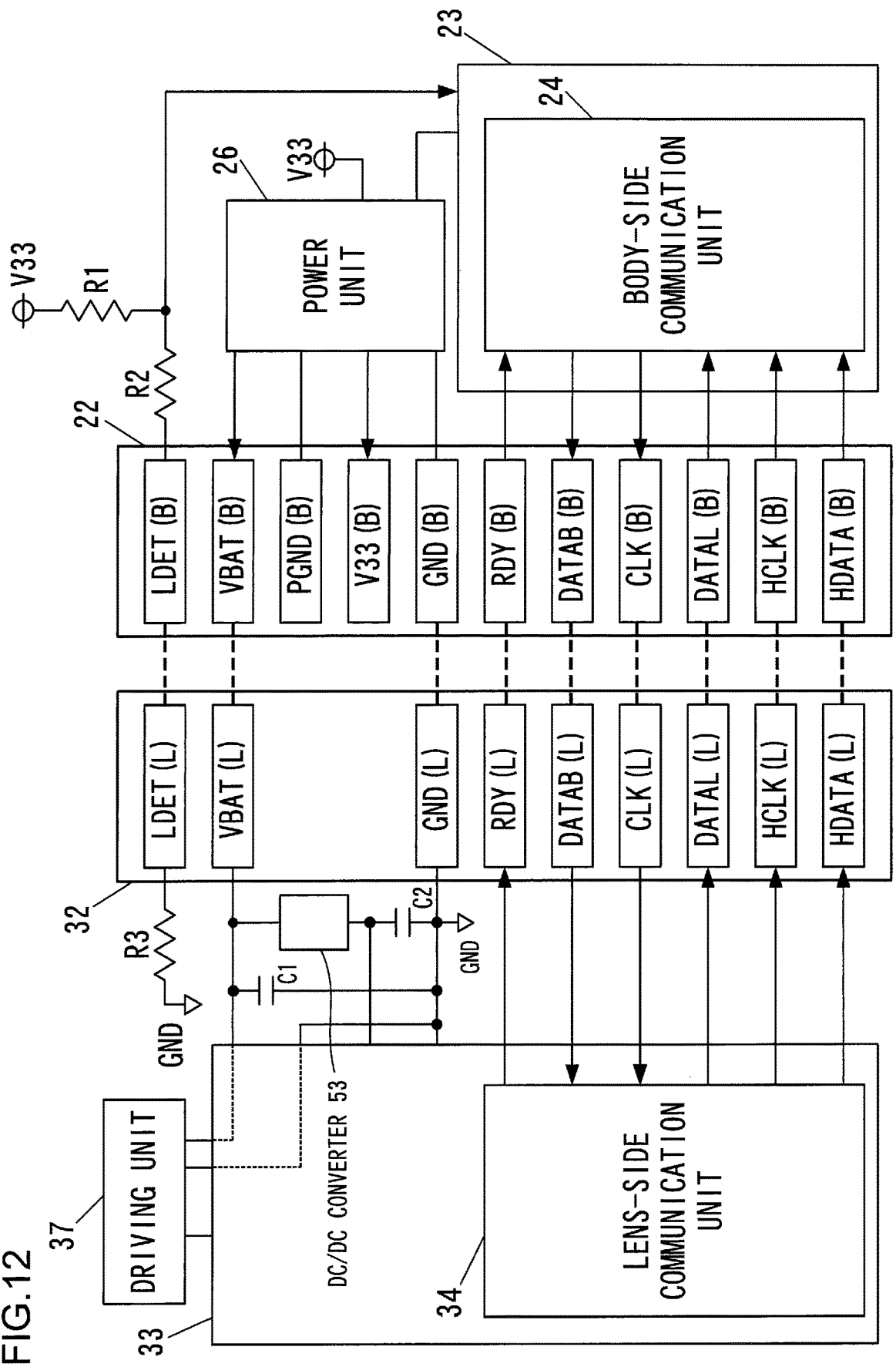
FIG. 12 is a circuit diagram schematically illustrating electrical connections between a camera body and an interchangeable lens according to a seventh embodiment.

Next, an interchangeable lens 3 of a camera system 1 according to a seventh embodiment will be described. Description of configurations common to the first embodiment described above is omitted. FIG. 12 is a circuit diagram schematically illustrating electrical connections between a camera body 2 and the interchangeable lens 3 according to the seventh embodiment. As illustrated in FIG. 12, a lens-side terminal holding unit 32 in the interchangeable lens 3 according to the seventh embodiment includes, like the interchangeable lens 3 according to the first embodiment, an LDET (L) terminal, VBAT (L) terminal, a GND (L) terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the seventh embodiment does not include the PGND (L) terminal and the V33 (L) terminal in the interchangeable lens 3 according to the first embodiment, so that no power to be supplied to the lens-side control unit 33 and the like is supplied from the camera body 2.

To cope with this, the interchangeable lens 3 according to the seventh embodiment includes a DC/DC converter 53. The DC/DC converter 53, which is a step-down voltage converter, for example, is connected to the VBAT (L) terminal and the lens-side control unit 33. The DC/DC converter 53 converts a voltage of power supply voltage supplied from the camera body 2 via the VBAT (L) terminal and supplies power to the lens-side control unit 33 and the like.

In addition, in the interchangeable lens 3 according to the seventh embodiment, the GND (L) terminal is used as a ground potential (ground) for power supply voltage for the circuitry. Also, the GND (L) terminal is connected to the driving unit 37 and the like units and is used as a ground potential (ground) for power supply voltage for the driving system. Between the VBAT (L) terminal and the GND (L) terminal, a bypass capacitor C1 is connected and between a wire for supplying power to the lens-side control unit 33 and the like from the DC/DC converter 53 and the GND (L) terminal, a bypass capacitor C2 is connected.

The connections and configurations of terminals other than the VBAT (L) terminal and the GND (L) terminal of the interchangeable lens 3 according to the seventh embodiment are similar to the interchangeable lens 3 according to the first embodiment. As with the example illustrated in FIG. 6, the terminals of LDET (L), VBAT (L), GND (L), RDY (L), DATAB (L), CLK (L), DATAL (L), HCLK (L), and HDATA (L) are arranged at the lens-side terminal holding unit 32.

Eighth Embodiment

Figure 13:
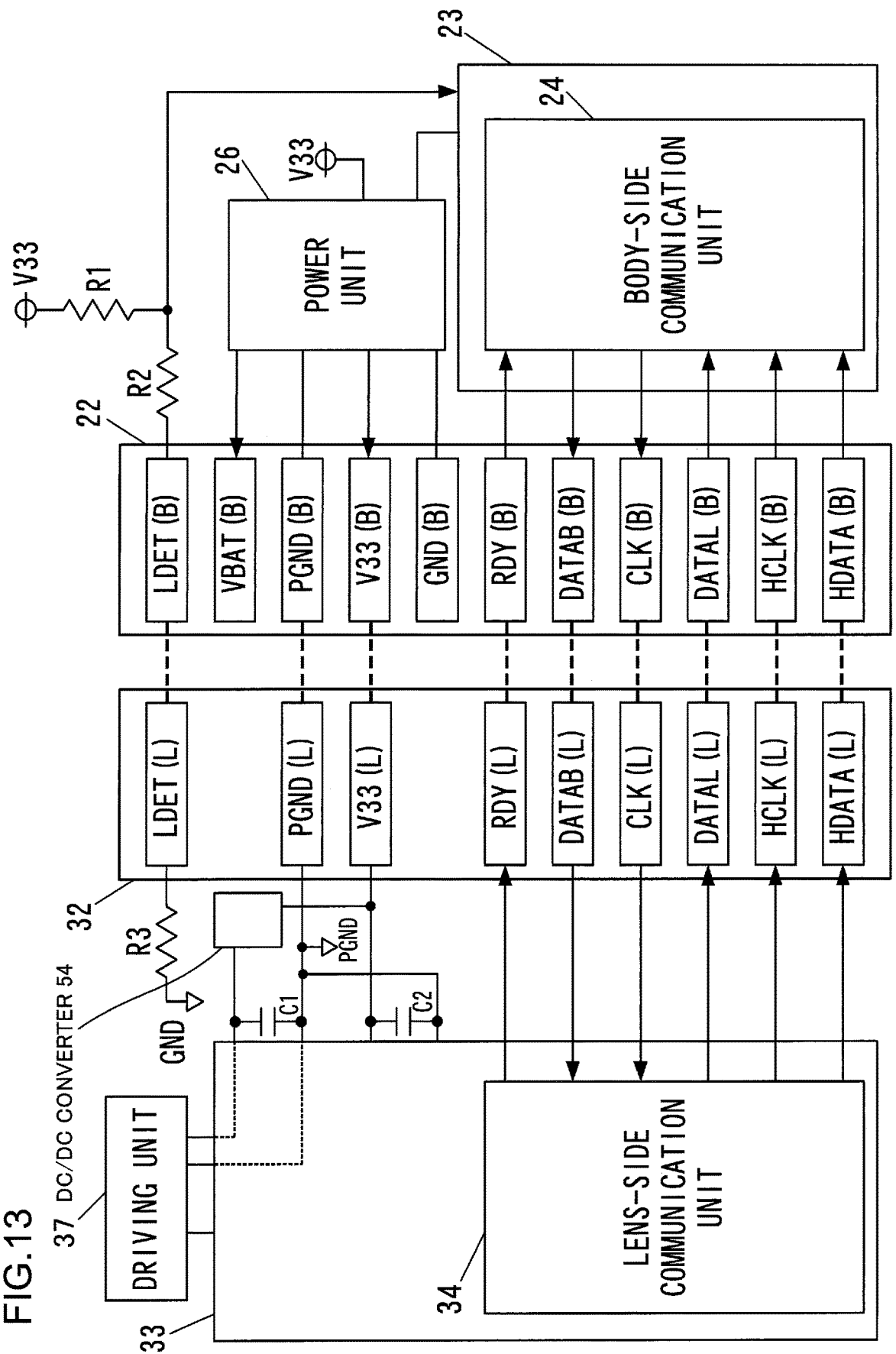
FIG. 13 is a circuit diagram schematically illustrating electrical connections between a camera body and an interchangeable lens according to an eighth embodiment.

Next, an interchangeable lens 3 of a camera system 1 according to an eighth embodiment will be described. Description of configurations common to the first embodiment described above is omitted. FIG. 13 is a circuit diagram schematically illustrating electrical connections between a camera body 2 and the interchangeable lens 3 according to the eighth embodiment. As illustrated in FIG. 13, a lens-side terminal holding unit 32 in the interchangeable lens 3 according to the eighth embodiment includes, like the interchangeable lens 3 according to the first embodiment, an LDET (L) terminal, a PGND (L) terminal, a V33 terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the eighth embodiment does not include the VBAT (L) terminal and the GND (L) terminal in the interchangeable lens 3 according to the first embodiment, so that no power for the driving system to be supplied to the driving unit 37 and the like is supplied from the camera body 2.

To cope with this, the interchangeable lens 3 according to the eighth embodiment includes a DC/DC converter 54. The DC/DC converter 54, which is a step-up voltage converter, for example, is connected to the V33 (L) terminal and the driving unit 37. The DC/DC converter 54 converts a voltage of power supply voltage supplied from the camera body 2 via the V33 (L) terminal and supplies power to the circuits of the driving system such as the driving unit 37 and the like.

In addition, in the interchangeable lens 3 according to the eighth embodiment, the PGND (L) terminal is used as a ground potential (ground) for power supply voltage for the driving system. Also, the PGND (L) terminal is connected to the lens-side control unit 33 and the like units and is used as a ground potential (ground) for power supply voltage for the circuitry. Between a wire for supplying power to the driving unit 37 and the like from the DC/DC converter 54 and the PGND (L) terminal, a bypass capacitor C1 is connected.

The connections and configurations of terminals other than the PGND (L) terminal and the V33 (L) terminal of the interchangeable lens 3 according to the eighth embodiment are similar to the interchangeable lens 3 according to the first embodiment. As with the example illustrated in FIG. 6, the terminals of LDET (L), PGND (L), V33, RDY (L), DATAB (L), CLK (L), DATAL (L), HCLK (L), and HDATA (L) are arranged at the lens-side terminal holding unit 32.

Ninth Embodiment

Figure 14:
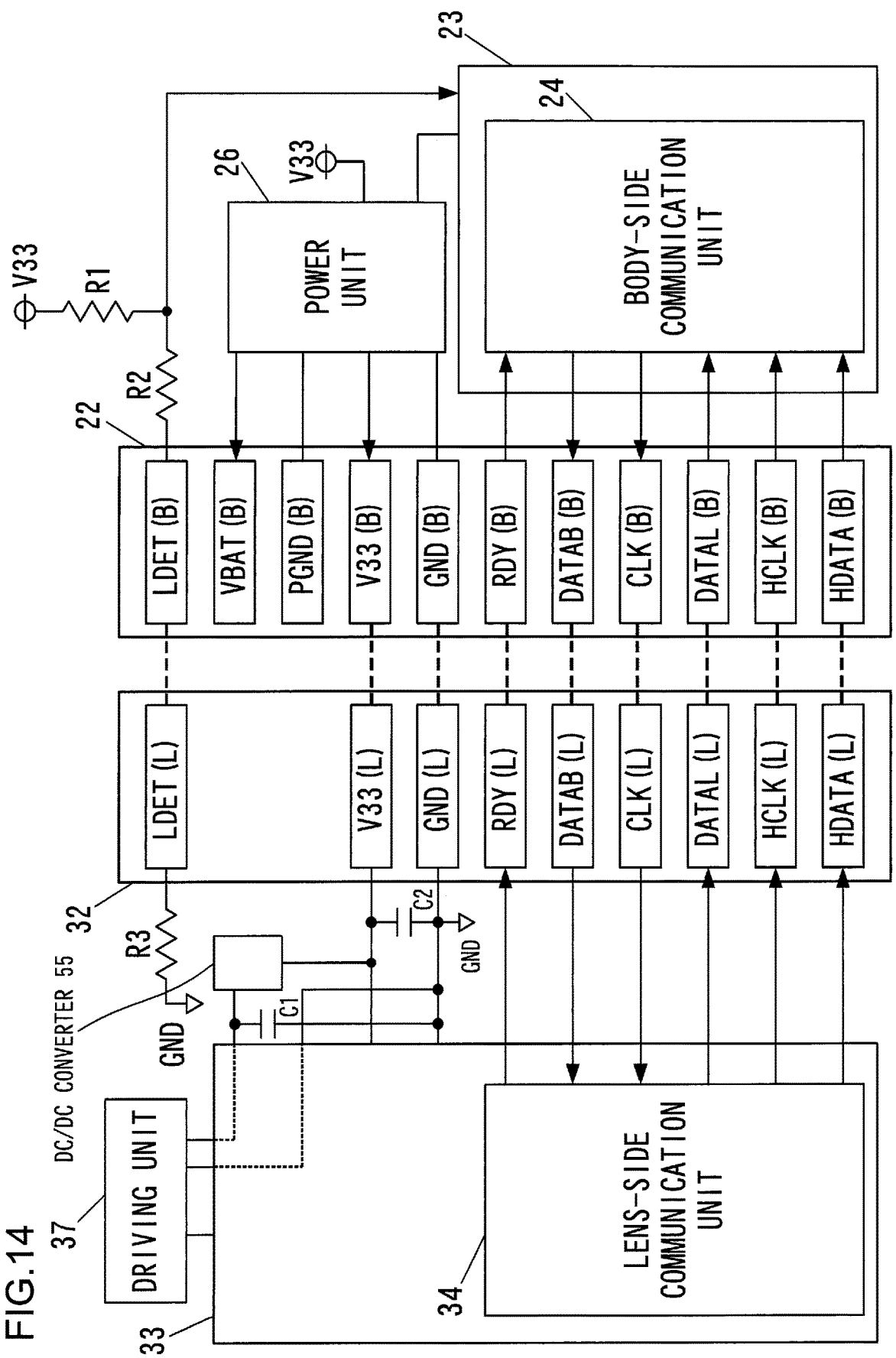
FIG. 14 is a circuit diagram schematically illustrating electrical connections between a camera body and an interchangeable lens according to a ninth embodiment.

Next, an interchangeable lens 3 of a camera system 1 according to a ninth embodiment will be described. Description of configurations common to the first embodiment described above is omitted. FIG. 14 is a circuit diagram schematically illustrating electrical connections between a camera body 2 and the interchangeable lens 3 according to the ninth embodiment. As illustrated in FIG. 14, a lens-side terminal holding unit 32 in the interchangeable lens 3 according to the ninth embodiment includes, like the interchangeable lens 3 according to the first embodiment, an LDET (L) terminal, a V33 (L) terminal, a GND (L) terminal, an RDY (L) terminal, a DATAB (L) terminal, a CLK (L) terminal, a DATAL (L) terminal, an HCLK (L) terminal, and an HDATA (L) terminal. However, the interchangeable lens 3 according to the ninth embodiment does not include the VBAT (L) terminal and the PGND (L) terminal in the interchangeable lens 3 according to the first embodiment, so that no power for the driving system to be supplied to the driving unit 37 and the like is supplied from the camera body 2.

To cope with this, the interchangeable lens 3 according to the ninth embodiment includes a DC/DC converter 55. The DC/DC converter 55, which is a step-up voltage converter, for example, is connected to the V33 (L) terminal and the driving unit 37. The DC/DC converter 55 converts a voltage of power supply voltage supplied from the camera body 2 via the V33 (L) terminal and supplies power to circuits for the driving system such as the driving unit 37 and the like.

In addition, in the interchangeable lens 3 according to the ninth embodiment, the GND (L) terminal is used as a ground potential (ground) for power supply voltage for the circuitry. Also, the GND (L) terminal is connected to the driving unit 37 and the like units and is used as a ground potential (ground) for power supply voltage for the driving system. Between a wire for supplying power to the driving unit 37 and the like from the DC/DC converter 55 and the GND (L) terminal, a bypass capacitor C1 is connected.

The connections and configurations of terminals other than the V33 (L) terminal and the GND (L) terminal of the interchangeable lens 3 according to the ninth embodiment are similar to the interchangeable lens 3 according to the first embodiment. As with the example illustrated in FIG. 6, the terminals of LDET (L), V33 (L), GND (L), RDY (L), DATAB (L), CLK (L), DATAL (L), HCLK (L), and HDATA (L) are arranged at the lens-side terminal holding unit 32.

Also the second to the ninth embodiments, as with the first embodiment, have effects of suppressing affections by various types of noises. The RDY terminal is positioned away from both the VBAT terminal and the HCLK terminal, which each may be a cause of nose, such that the RDY terminal is not adjacent to the VBAT terminal and the HCLK terminal. In this way, suppression of effects of noises on the RDY terminal that is used to indicate whether or not the command communication is allowed can be suppressed.

In addition, the HCLK terminal that may be a cause of noise is positioned between the HDATA terminal and the DATAL terminal, and the CLK terminal is positioned between the DATAL terminal and the DATAB terminal. In other words, the HDATA terminal, the HCLK terminal, the DATAL terminal, the CLK terminal, and the DATAB terminal are arranged in order from the last end in the attachment direction. In this way, effects of noises caused by a clock signal into the RDY and the like terminals can be suppressed.

Further, in consideration of effects of noises, terminals for power supply are positioned away from terminals used for communication across the RDY terminal. Specifically, with the RDY terminal in between, on the head end side from the RDY terminal, terminals for power supply: the VBAT terminal, the PGND terminal, the V33 terminal, and the GND terminal are arranged in order from the head end side, and on the last end side from the RDY terminal, terminals used for communication: the DATAB terminal, the CLK terminal, the DATAL terminal, the HCLK terminal, and the HDATA terminal are arranged in order from the head end side. In this way, effects of power supply-related terminals such as the VBAT terminal on any terminal used for communication can be suppressed. Effects of noises from the terminals for power supply such as the VBAT terminal and the terminals used for communication such as the HCLK or CLK terminal on the RDY terminal can be suppressed.

As for the HCLK terminal through which a clock signal (H clock signal) used for the hot-line communication and the CLK terminal through which a clock signal (C clock signal) used for the command data communication, the HCLK terminal is positioned farther away from the VBAT terminal than the CLK terminal. The reason is as follows. The clock signal (C clock signal) transmitted to the interchangeable lens 3 through the CLK terminal is output by the body-side control unit 23 through the body-side communication unit 24. However, any noise affecting the clock signal (H clock signal) transmitted to the camera body through the HCLK (L) terminal from the interchangeable lens via the lens-side communication unit 34 may be a cause of erroneous recognition by the body-side control unit 23. Therefore, a noise affecting the clock signal (H clock signal) on the HCLK terminal has a greater effect on the camera system 1.

As for the HCLK terminal and the GND terminal, the HCLK terminal is positioned farther away from the VBAT terminal than the GND terminal. In addition, the PGND terminal is positioned between the GND terminal and the VBAT terminal. In this way, the HCLK terminal through which the clock signal (H clock signal) used for the hot-line communication is transmitted can be shielded from any noise originating from the VBAT terminal.

As for the CLK terminal and the GND terminal, the CLK terminal is positioned farther away from the VBAT terminal than the GND terminal. In addition, the PGND terminal is positioned between the GND terminal and the VBAT terminal. In this way, the CLK terminal through which the clock signal (C clock signal) used for the command data communication is transmitted can be shielded from any noise originating from the VBAT terminal.

It may be possible to provide the following variations, and may also be possible to combine one or more variations with the embodiments described above.

Variation 1

Any terminal used for the command data communication or the hot-line communication may also be provided with a function to transmit a power-on signal from the interchangeable lens 3 to the camera body 2. For example, the interchangeable lens 3 may have a power switch function. While the interchangeable lens 3 is in the attachment completion state and the camera system 1 is in a powered-off state, the power unit 26 supplies power to the lens-side control unit 33 of the interchangeable lens 3 from the V33 (B) terminal. Upon operation of the power switch of the interchangeable lens 3, for example, the lens-side control unit 33 outputs the power-on signal to the RDY (L) terminal via the lens-side communication unit 34. Upon detection of the power-on signal through the RDY (B) terminal via the body-side communication unit 24, the body-side control unit 23 makes the camera system 1 transition from the powered-off state to a powered-on state similarly to the case where a power switch (not illustrated) on the camera body 2 is operated.

Variation 2

In the embodiments, the DATAB (B) terminal is positioned on the head end side from the CLK (B) terminal in the attachment direction and the DATAL (B) terminal is positioned on the last end side; however, the positions of the DATAB (B) and DATAL (B) terminals may be exchanged. In other words, from the head end side in the attachment direction, the DATAL (B) terminal, the CLK (B) terminal, and the DATAB (B) terminal may be arranged in order.

In addition, as for the terminals of lens-side terminal described in the above-mentioned embodiments, the LDET (L) terminal may be referred to as a detection terminal. In addition, the VBAT (L) terminal may be referred to as a power supply terminal or a first power supply terminal. In addition, the PGND (L) terminal may be referred to as a ground terminal or a first ground terminal. In addition, the V33 (L) terminal may be referred to as a power supply terminal or a second power supply terminal. In addition, the GND terminal may be referred to as a ground terminal or a second ground terminal. In addition, the RDY terminal may be referred to as a ready terminal. In addition, the DATAB (L) terminal may be referred to as a data terminal or a first data terminal. In addition, the CLK (L) terminal may be referred to as a clock terminal or a first clock terminal. In addition, the DATA (L) terminal may be referred to as a data terminal or a second data terminal. In addition, the HCLK (L) terminal may be referred to as a clock terminal or a second clock terminal. In addition, the HDATA (L) terminal may be referred to as a data terminal or a third data terminal.

It will be noted that, in the embodiments, although description has been made with reference to an interchangeable lens for a camera as an example for an accessory, the accessory is not limited to the interchangeable lens. For example, the accessory may include one that is attached between the camera body and the interchangeable lens to change the focal length of the interchangeable lens, such as a teleconverter, a wideconverter, or a closeup ring. Alternatively, the embodiments may be applicable to a mount adapter or the like for attaching an accessory including the interchangeable lens of a different mount standard to the above-described camera body of a certain mount standard. In other words, the embodiments may be applicable to any accessory as long as it is attached to a mount of a camera body to use. In this case, the lens-side terminals, the lens-side claws 39, and the lens-side communication unit 34 respectively correspond to accessary-side terminals, accessary-side protruding portions, and an accessary-side communication unit of the accessory, and so on.

In the embodiments, although description has been made as to an accessory that can be removably attached to a camera body, the camera body described above may be a mount adapter for attaching an interchangeable lens of the above-described mount standard to a camera body that has a different mount standard from the above, and the embodiments may be configured to make the above-described accessory attachable to the mount adapter.

REFERENCE SIGNS LIST

1 . . . camera system, 2 . . . camera body, 3 . . . interchangeable lens, 21 . . . body-side mount, 22 . . . body-side terminal holding unit, 31 . . . lens-side mount, 32 . . . lens-side terminal holding unit

The invention claimed is:

1. An accessory removably attachable to a camera body and including a plurality of terminals configured to come into contact with a plurality of terminals of the camera body, the accessory comprising:
a detection terminal by which the camera body detects that the accessory is attached to the camera body; and
a power supply terminal group that consists of (a) at least one power supply terminal through which a power supply voltage is supplied from the camera body, and (b) at least one ground terminal used as a ground potential, wherein: the number of the at least one power supply terminal is smaller than the number of the at least one ground terminal, and
the plurality of terminals of the accessory includes the detection terminal and the power supply terminal group that are arranged in order from one end of the plurality of terminals, with the detection terminal located at the one end of the plurality of terminals and the power supply terminal group located adjacent to the detection terminal.

2. The accessory according to claim 1, further comprising:
a first communication terminal used for first communication in which data is transmitted to the camera body and received from the camera body bidirectionally; and
a second communication terminal used for second communication which is performed in one direction to the camera body independently of the first communication, wherein:
the at least one power supply terminal is disposed farther from the second communication terminal than from the first communication terminal.

3. The accessory according to claim 1, wherein:
the at least one power supply terminal includes a first power supply terminal through which a first power supply voltage is supplied and a second power supply terminal through which a second power supply voltage different from the first power supply voltage is supplied;
the at least one ground terminal includes a first ground terminal;
the accessory further comprises:
 a first circuit to which the first power supply voltage is supplied through the first power supply terminal; and
 a second circuit to which the second power supply voltage is supplied through the second power supply terminal; and
the first ground terminal is used as a ground potential for the first circuit and the second circuit.

4. The accessory according to claim 3, further comprising:
a driven member that is movable, wherein:
the first circuit drives the driven member; and
the second circuit controls driving of the driven member.

5. The accessory according to claim 3, further comprising:
a driven member that is movable; and
a communication terminal for communicating data relating to the driven member with the camera body, wherein:
the first circuit drives the driven member; and
the second circuit controls communication of the data through the communication terminal.

6. The accessory according to claim 3, wherein:
the number of the at least one ground terminal is one.

7. The accessory according to claim 1, wherein:
the at least one power supply terminal includes a first power supply terminal through which a first power supply voltage is supplied;
the at least one ground terminal includes a first ground terminal and a second ground terminal;
the accessory further comprises:
 a voltage conversion circuit that converts the first power supply voltage into a second power supply voltage;
 a first circuit to which the first power supply voltage is supplied through the first power supply terminal; and
 a second circuit to which the second power supply voltage from the voltage conversion circuit is supplied;
the first ground terminal is used as a ground potential for the first circuit; and
the second ground terminal is used as a ground potential for the second circuit.

8. The accessory according to claim 7, further comprising:
a driven member that is movable, wherein:
the first circuit drives the driven member; and
the second circuit controls driving of the driven member.

9. The accessory according to claim 7, further comprising:
a driven member that is movable; and
a communication terminal for communicating data relating to the driven member with the camera body, wherein:
the first circuit drives the driven member; and
the second circuit controls communication of the data through the communication terminal.

10. The accessory according to claim 7, wherein:
the number of the at least one power supply terminal is one.

11. The accessory according to claim 1, further comprising:
an optical system that forms an image of a subject, the optical system including an aperture that is configured to change an amount of light from the subject;
a circuit that is configured to move the optical system and the aperture by the power supply voltage supplied through the at least one power supply terminal; and
a communication terminal for communicating data relating to driving of the optical system and the aperture with the camera body.

12. The accessory according to claim 11, wherein:
the accessory is an interchangeable lens.

13. The accessory according to claim 1, further comprising:
a communication terminal group that consists of a plurality of terminals used in a communication with the camera body, wherein
the plurality of terminals of the accessory includes the detection terminal, the power supply terminal group, and the communication terminal group that are arranged in order from the one end of the plurality of terminals.

14. An accessory removably attachable to a camera body and including a plurality of terminals configured to come into contact with a plurality of terminals of the camera body, the accessory comprising:
a detection terminal by which the camera body detects that the accessory is attached to the camera body;
a power supply terminal group that consists of (a) a power supply terminal through which a first power supply voltage is supplied from the camera body; and (b) a ground terminal used as a ground terminal;
a voltage conversion circuit that converts the first power supply voltage into a second power supply voltage;
a first circuit to which the first power supply voltage is supplied through the power supply terminal; and
a second circuit to which the second power supply voltage from the voltage conversion circuit is supplied, wherein:
the ground terminal is used as a ground potential for the first circuit and the second circuit, and
the plurality of terminals of the accessory includes the detection terminal and the power supply terminal group that are arranged in order from one end of the plurality of terminals, with the detection terminal located at the one end of the plurality of terminals and the power supply terminal group located adjacent to the detection terminal.

15. The accessory according to claim 14, further comprising:
a driven member that is movable, wherein:
the first circuit drives the driven member; and
the second circuit controls driving of the driven member.

16. The accessory according to claim 14, further comprising:
a driven member that is movable; and
a communication terminal for communicating data relating to the driven member with the camera body, wherein:
the first circuit drives the driven member; and
the second circuit controls communication of the data through the communication terminal.

17. The accessory according to claim 14, further comprising:
a communication terminal group that consists of a plurality of terminals used in a communication with the camera body, wherein
the plurality of terminals of the accessory includes the detection terminal, the power supply terminal group, and the communication terminal group that are arranged in order from the one end of the plurality of terminals.

18. An accessory removably attachable to a camera body and including a plurality of terminals configured to come into contact with a plurality of terminals of the camera body, the accessory comprising:
a detection terminal by which the camera body detects that the accessory is attached to the camera body;
a power supply terminal group that consists of (a) at least one power supply terminal through which a power supply voltage is supplied from the camera body, and (b) at least one ground terminal used as a ground potential;
a first communication terminal used for first communication in which data is transmitted to the camera body and received from the camera body bidirectionally; and
a second communication terminal used for second communication which is performed in one direction to the camera body independently of the first communication, wherein:
the number of the at least one power supply terminal and the number of the at least one ground terminal are different from one another,
the plurality of terminals of the accessory includes the detection terminal and the power supply terminal group that are arranged in order from one end of the plurality of terminals, with the detection terminal located at the one end of the plurality of terminals and the power supply terminal group located adjacent to the detection terminal, and
the at least one power supply terminal is disposed farther from the second communication terminal than from the first communication terminal.

* * * * *